(12) United States Patent
Hasegawa et al.

(10) Patent No.: US 12,335,443 B2
(45) Date of Patent: *Jun. 17, 2025

(54) IMAGING ELEMENT WITH OUTPUT CIRCUIT THAT OUTPUTS TO FIRST AND SECOND CIRCUITS, IMAGING APPARATUS, IMAGE DATA OUTPUT METHOD, AND PROGRAM

(71) Applicant: FUJIFILM CORPORATION, Tokyo (JP)

(72) Inventors: Ryo Hasegawa, Saitama (JP); Tomoyuki Kawai, Saitama (JP); Hitoshi Sakurabu, Saitama (JP)

(73) Assignee: FUJIFILM CORPORATION, Tokyo (JP)

( * ) Notice: Subject to any disclaimer, the term of this patent is extended or adjusted under 35 U.S.C. 154(b) by 7 days.

This patent is subject to a terminal disclaimer.

(21) Appl. No.: 18/461,189

(22) Filed: Sep. 5, 2023

(65) Prior Publication Data

US 2023/0421925 A1    Dec. 28, 2023

Related U.S. Application Data

(63) Continuation of application No. 17/821,292, filed on Aug. 22, 2022, now Pat. No. 11,785,362, which is a
(Continued)

(30) Foreign Application Priority Data

Sep. 27, 2018    (JP) ................................. 2018-181886

(51) Int. Cl.
*H04N 23/951*    (2023.01)
*H04N 25/766*    (2023.01)
*H04N 25/78*    (2023.01)

(52) U.S. Cl.
CPC ......... *H04N 23/951* (2023.01); *H04N 25/766* (2023.01); *H04N 25/78* (2023.01)

(58) Field of Classification Search
CPC .. H04N 25/772; H04N 23/951; H04N 25/766; H04N 23/62; H04N 23/667;
(Continued)

(56) References Cited

U.S. PATENT DOCUMENTS 9,473,701 B2    10/2016  Tsuda
10,819,895 B2   10/2020  Kamino
(Continued)

FOREIGN PATENT DOCUMENTS

CN    1816108 A    8/2006
JP    2005-191697 A    7/2005
(Continued)

OTHER PUBLICATIONS

English language translation of the following: Office action dated Apr. 20, 2024 from the SIPO in a Chinese patent application No. 201980061245.6 corresponding to the instant patent application.
(Continued)

*Primary Examiner* — Padma Haliyur
(74) *Attorney, Agent, or Firm* — SOLARIS Intellectual Property Group, PLLC

(57) ABSTRACT

An imaging element includes: a processing circuit that performs analog/digital conversion on captured image data; a memory that is capable of storing the captured image data obtained as a result of performing the analog/digital conversion by the processing circuit; and an output circuit that outputs output image data based on the captured image data to an exterior of the imaging element, wherein the output circuit includes a first output line and a second output line, the first output line is connected to a first signal processing circuit disposed at the exterior, the second output line is
(Continued)

connected to a second signal processing circuit disposed at the exterior, and at least one of an output frame rate or an output data amount of the output image data is different between the first output line and the second output line.

11 Claims, 14 Drawing Sheets

Related U.S. Application Data continuation of application No. 17/197,009, filed on Mar. 9, 2021, now Pat. No. 11,463,646, which is a continuation of application No. PCT/JP2019/025649, filed on Jun. 27, 2019.

(58) Field of Classification Search
CPC ...... H04N 25/00; H04N 25/445; H04N 25/78; H04N 25/79; H04N 23/651
See application file for complete search history.

(56) References Cited

U.S. PATENT DOCUMENTS

| | | | |
|---|---|---|---|
| 2006/0132622 | A1 | 6/2006 | Ikeyama et al. |
| 2008/0049121 | A1* | 2/2008 | Tsujimura .......... H04N 21/4122 386/E5.072 |
| 2012/0301099 | A1 | 11/2012 | Hirano et al. |
| 2014/0194686 | A1 | 7/2014 | Murayama |
| 2015/0036033 | A1 | 2/2015 | Tatsuzawa et al. |
| 2015/0271462 | A1* | 9/2015 | Kobayashi ............... H04N 9/79 348/222.1 |
| 2016/0286155 | A1 | 9/2016 | Bhuvanagiri et al. |
| 2016/0352959 | A1 | 12/2016 | Negishi |
| 2018/0139395 | A1 | 5/2018 | Toyoda |
| 2019/0166306 | A1 | 5/2019 | Zen et al. |
| 2019/0268525 | A1 | 8/2019 | Okada |
| 2021/0099665 | A1 | 4/2021 | McGarvey et al. |

FOREIGN PATENT DOCUMENTS

| | | |
|---|---|---|
| JP | 2006-303956 A | 11/2006 |
| JP | 2007-259428 A | 10/2007 |
| JP | 2007-288768 A | 11/2007 |
| JP | 2012-019373 A | 1/2012 |
| JP | 102754448 A | 10/2012 |
| JP | 2013-164915 A | 8/2013 |
| JP | 2014-147667 A | 8/2014 |
| JP | 2015-032917 A | 2/2015 |
| JP | 2015-177301 A | 10/2015 |
| JP | 2017-188760 A | 10/2017 |
| JP | 2017-192100 A | 10/2017 |
| JP | 2018-38073 A | 3/2018 |
| WO | 2017-043097 A1 | 3/2017 |
| WO | 2017/179249 A1 | 10/2017 |

OTHER PUBLICATIONS

English language translation of the following: Office action dated Nov. 28, 2023 from the SIPO in a Chinese patent application No. 201980061245.6 corresponding to the instant patent application. This office action translation is submitted now in order to supplement the understanding of the cited references which are being disclosed in the instant Information Disclosure Statement.
International Search Report issued in International Application No. PCT/JP2019/025649 on Sep. 17, 2019.
Written Opinion of the ISA issued in International Application No. PCT/JP2019/025649 on Sep. 17, 2019.
International Preliminary Report on Patentability issued in International Application No. PCT/JP2019/025649 on Jul. 14, 2020.
Non-Final Office Action issued by USPTO on Mar. 16, 2022, in related U.S. Appl. No. 17/197,009.
Notice of Allowance issued by USPTO on Jun. 1, 2022, in related U.S. Appl. No. 17/197,009.
English language translation of the following: Office action dated Jun. 13, 2023 from the JPO in a Japanese patent application No. 2021-126630 corresponding to the instant patent application.
Non-Final Office Action issued by USPTO on Mar. 29, 2023, in related U.S. Appl. No. 17/821,292.
Notice of Allowance issued by USPTO on Jun. 9, 2023, in related U.S. Appl. No. 17/821,292.
English language translation of the following: Office action dated Nov. 26, 2024 from the JPO in a Japanese patent application No. 2023-216236 corresponding to the instant patent application.

* cited by examiner

IMAGING ELEMENT WITH OUTPUT CIRCUIT THAT OUTPUTS TO FIRST AND SECOND CIRCUITS, IMAGING APPARATUS, IMAGE DATA OUTPUT METHOD, AND PROGRAM

CROSS-REFERENCE TO RELATED APPLICATIONS

This application is a continuation application of, and claims priority to, U.S. application Ser. No. 17/821,292, filed Aug. 22, 2022, which is a continuation application of, and claims priority to, U.S. application Ser. No. 17/197,009, filed Mar. 9, 2021, which is a continuation application of International Application No. PCT/JP2019/025649, filed on Jun. 27, 2019, the disclosures of which are incorporated by reference herein in their entireties. Further, this application claims priority from Japanese Patent Application No. 2018-181886, filed on Sep. 27, 2018, the disclosure of which is incorporated by reference herein in its entirety.

BACKGROUND

Technical Field

The technology of the present disclosure relates to an imaging element, an imaging apparatus, an image data output method, and a non-transitory program storage medium.

Related Art

JP2017-188760A discloses a laminated imaging element in which a memory substrate and a signal processing substrate are laminated. The memory substrate includes a memory such as a dynamic random access memory (DRAM) that temporarily stores a pixel signal output by a pixel substrate. The signal processing substrate executes various types of signal processing on an image signal stored in the memory substrate. In the laminated imaging element disclosed in JP2017-188760A, the signal processing substrate outputs the image signal subjected to various types of signal processing to an image processing portion. The image processing portion performs demosaicing on the image signal input from the signal processing substrate. The image signal after the demosaicing is displayed on a display portion and stored in a storage portion by the image processing portion.

JP2015-177301A discloses a digital camera comprising an imaging portion and an image processing portion. In the digital camera disclosed in JP2015-177301A, the imaging portion is connected to the image processing portion, and the image processing portion is positioned in an electrically rear stage of the imaging portion. Thus, image data obtained by imaging by the imaging portion is output to the image processing portion from the imaging portion. The image processing portion performs a predetermined type of calculation processing using the image data and performs auto white balance processing of a through the lens (TTL) type based on a calculation result. In addition, the image processing portion performs AF processing using an auto focus (AF) evaluation value provided from the imaging portion.

JP2013-164915A discloses an imaging apparatus comprising an imaging element and a system control portion. The imaging element is connected to the system control portion. The system control portion is positioned in an electrically rear stage of the imaging element. The system control portion comprises an image processing portion, and the imaging element passes an image signal to the image processing portion of the system control portion. The image processing portion generates image data by performing various types of image processing using a work memory. The generated image data is recorded in a recording portion and is converted into a display signal and displayed on a display portion.

JP2018-038073A discloses an imaging element (506) comprising an imaging unit that receives and photoelectrically converts an incidence ray, a plurality of AD conversion units that convert an analog image signal output from the imaging unit into digital image data, a storage unit that can store the digital image data of at least one frame converted by the plurality of AD conversion units, a processing unit that changes a size of the digital image data converted by the plurality of AD conversion units, and an output unit that outputs the digital image data to an outside.

In the imaging element (506) disclosed in JP2018-038073A, the digital image data is parallelly transferred to the storage unit from the plurality of AD conversion units, and first digital image data and second digital image data having a smaller size than the first digital image data are generated by the processing unit. In a case where the first digital image data and the second digital image data are output to the outside (507) by the output unit, the first digital image data is stored in the storage unit, and the second digital image data is preferentially output to the outside (507) over the first digital image data by the output unit.

In addition, in the imaging element (506) disclosed in JP2018-038073A, a first motion picture and a second motion picture having a higher frame rate than the first motion picture are imaged by the imaging unit. In a case where the first digital image data corresponding to the first motion picture and the second digital image data corresponding to the second motion picture are output to the outside by the output unit, the second digital image data is stored in the storage unit, and the first digital image data is preferentially output to the outside (507) over the second digital image data by the output unit.

In all of the technologies disclosed in JP2017-188760A, JP2015-177301A, JP2013-164915A, and JP2018-038073A, the image data is transferred from the imaging element to the processing portion (hereinafter, referred to as a "rear stage processing portion") positioned in the electrically rear stage of the imaging element. The rear stage processing portion generates and outputs image data for displaying and image data for recording by performing various types of processing on the image data transferred from the imaging element.

SUMMARY

One embodiment of the present invention provides an imaging element, an imaging apparatus, an image data output method, and a non-transitory storage medium storing a program capable of reducing electric power consumption required for processing of output image data, compared to a case where output image data is output to only a single processing portion in a rear stage from an imaging element through only a single output line at a constant frame rate and a constant data amount.

A first aspect according to the technology of the present disclosure is an imaging element comprising a processing circuit that performs analog/digital conversion on captured image data obtained by imaging a subject, the processing circuit being incorporated in the imaging element; a memory that is capable of storing the captured image data obtained as a result of performing the analog/digital conversion by the processing circuit, the memory being incorporated in the imaging element; and an output circuit that outputs output image data based on the captured image data stored in the memory to an exterior of the imaging element, the output circuit being incorporated in the imaging element, wherein the output circuit includes a first output line and a second output line, the first output line is connected to a first signal processing circuit disposed at the exterior, the second output line is connected to a second signal processing circuit disposed at the exterior, and at least one of an output frame rate of the output image data or an output data amount of the output image data is different between the first output line and the second output line.

Accordingly, the imaging element of the first aspect according to the technology of the present disclosure can reduce electric power consumption required for processing of the output image data, compared to a case where the output image data is output to only a single processing circuit in a rear stage from the imaging element through only a single output line at a constant frame rate and a constant data amount.

A second aspect according to the technology of the present disclosure is the imaging element according to the first aspect, in which the output frame rate of the first output line is higher than the output frame rate of the second output line.

Accordingly, the imaging element of the second aspect according to the technology of the present disclosure can cause the first signal processing circuit to execute processing at a higher speed than processing executed by the second signal processing circuit.

A third aspect according to the technology of the present disclosure is the imaging element according to the first aspect or the second aspect, in which the output data amount of one frame of the output image data output from the first output line is smaller than the output data amount of one frame of the output image data output from the second output line.

Accordingly, the imaging element of the third aspect according to the technology of the present disclosure can reduce electric power consumption required for output in the first output line, compared to electric power consumption required for output in the second output line.

A fourth aspect according to the technology of the present disclosure is the imaging element according to the first aspect, in which the output frame rate of the first output line is n times the output frame rate of the second output line, and the output data amount of one frame of the output image data output from the first output line is 1/n times the output data amount of one frame of the output image data output from the second output line, where n is a predetermined positive real number.

Accordingly, the imaging element of the fourth aspect according to the technology of the present disclosure can determine the output frame rate and the output data amount that contribute to reduction of electric power consumption.

A fifth aspect according to the technology of the present disclosure is the imaging element according to any one aspect of the first aspect to the fourth aspect, in which wherein the output data amount of the output image data is made different between the first output line and the second output line by setting a number of bits of the output image data to be different between the first output line and the second output line.

Accordingly, the imaging element of the fifth aspect according to the technology of the present disclosure can differently set a time period required for outputting the output image data to the first signal processing circuit from the output circuit, and a time period required for outputting the output image data to the second signal processing circuit from the output circuit.

A sixth aspect according to the technology of the present disclosure is the imaging element according to the fifth aspect, in which the number of bits of the output image data output from the first output line is smaller than the number of bits of the output image data output from the second output line.

Accordingly, the imaging element of the sixth aspect according to the technology of the present disclosure can set the time period required in a case of outputting the output image data to the first signal processing circuit from the output circuit, to be shorter than the time period required in a case of outputting the output image data to the second signal processing circuit from the output circuit.

A seventh aspect according to the technology of the present disclosure is the imaging element according to any one aspect of the second aspect to the sixth aspect, in which the output image data output from the first output line is image data for displaying, and the output image data output from the second output line is image data for recording.

Accordingly, the imaging element of the seventh aspect according to the technology of the present disclosure can cause the first signal processing circuit to process the image data for displaying and cause the second signal processing circuit to process the image data for recording.

An eighth aspect according to the technology of the present disclosure is the imaging element according to any one aspect of the first aspect to the seventh aspect, in which the output image data output from the second output line is image data obtained as a result of performing image processing on the captured image data by the processing circuit in the imaging element.

Accordingly, the imaging element of the eighth aspect according to the technology of the present disclosure can reduce a load of image processing related to the second signal processing circuit, compared a case where all types of image processing for the captured image data are executed by the second signal processing circuit.

A ninth aspect according to the technology of the present disclosure is the imaging element according to the eighth aspect, in which the captured image data is a plurality of items of thinned image data indicating a plurality of thinned images in which mutually different pixels are thinned, and the image processing included processing of combining the plurality of items of thinned image data.

Accordingly, the imaging element of the ninth aspect according to the technology of the present disclosure can suppress an increase in electric power consumption caused by the data amount, compared to a case of using only the non-thinned image data as the captured image data.

A tenth aspect according to the technology of the present disclosure is the imaging element according to any one aspect of the first aspect to the ninth aspect, in which the imaging element is a stacked imaging element that includes the photoelectric conversion element, and in which the photoelectric conversion element is stacked on the memory.

Accordingly, the imaging element of the tenth aspect according to the technology of the present disclosure can implement high speed processing in the imaging element, compared to a case where an imaging element of a type in which the photoelectric conversion element is not stacked on the memory is used.

An eleventh aspect according to the technology of the present disclosure is an imaging apparatus comprising the imaging element according to any one aspect of the first aspect to the tenth aspect according to the technology of the present disclosure, and a processor that performs a control for displaying, on a display, an image based on the output image data output by the output circuit included in the imaging element.

Accordingly, the imaging apparatus of the eleventh aspect according to the technology of the present disclosure can reduce electric power consumption required for processing of the output image data, compared to a case where the output image data is output to only a single processing circuit in a rear stage from the imaging element through only a single output line at a constant frame rate and a constant data amount.

A twelfth aspect according to the technology of the present disclosure is an image data output method of an imaging element incorporating a processing circuit that performs analog/digital conversion on captured image data obtained by imaging a subject, a memory that is capable of storing the captured image data obtained as a result of performing processing by the processing circuit, and an output circuit that includes a first output line and a second output line, the image data output method comprising: connecting the first output line to a first signal processing circuit disposed at an exterior of the imaging element; connecting the second output line to a second signal processing circuit disposed at the exterior; outputting, by the output circuit, output image data based on the captured image data stored in the memory to the exterior; and setting at least one of an output frame rate of the output image data or an output data amount of the output image data to be different between the first output line and the second output line.

Accordingly, the image data output method of the twelfth aspect according to the technology of the present disclosure can reduce electric power consumption required for processing of the output image data, compared to a case where the output image data is output to only a single processing circuit in a rear stage from the imaging element through only a single output line at a constant frame rate and a constant data amount.

A thirteenth aspect according to the technology of the present disclosure is a non-transitory storage medium storing program that causes an imaging element to perform an image data output processing, the imaging element incorporating a processing circuit that performs analog/digital conversion on captured image data obtained by imaging a subject, a memory that is capable of storing the captured image data obtained as a result of performing processing by the processing circuit, and the output circuit that includes a first output line and a second output line, wherein the first output line is connected to a first signal processing circuit disposed at an exterior of the imaging element, and the second output line is connected to a second signal processing circuit disposed at the exterior, the image data output processing comprising: outputting, by the output circuit, output image data based on the captured image data stored in the memory to the exterior, and setting at least one of an output frame rate of the output image data or an output data amount of the output image data to be different between the first output line and the second output line.

Accordingly, the storage medium of the thirteenth aspect according to the technology of the present disclosure can reduce electric power consumption required for processing of the output image data, compared to a case where the output image data is output to only a single processing circuit in a rear stage from the imaging element through only a single output line at a constant frame rate and a constant data amount.

A fourteenth aspect according to the technology of the present disclosure is an imaging element comprising a memory that is capable of storing captured image data obtained by imaging a subject and is incorporated in the imaging element, and a processor that outputs output image data based on the captured image data stored in the memory and is incorporated in the imaging element, in which the processor includes a first output line and a second output line, the first output line is connected to a first signal processing circuit disposed at an exterior of the imaging element, the second output line is connected to a second signal processing circuit disposed at the exterior, and at least one of an output frame rate of the output image data or an output data amount of the output image data is different between the first output line and the second output line.

According to one embodiment of the present disclosure, an effect of being able to reduce electric power consumption required for processing of the output image data compared to a case where the output image data is output to only a single processing circuit in a rear stage from the imaging element through only a single output line at a constant frame rate and a constant data amount is achieved.

DETAILED DESCRIPTION

Hereinafter, one example of an embodiment of an imaging apparatus according to the embodiment of the technology of the present disclosure will be described in accordance with the appended drawings.

In a rear stage processing portion of conventional techniques, various types of image processing are performed in addition to reception of the image data from the imaging element. Thus, in a case where a data amount of the image data transferred from the imaging element is increased, a processing load in the rear stage processing portion is increased in accordance with the increase in data amount. In a case where the processing load in the rear stage processing portion is increased, electric power consumption is also increased.

Figure 17:
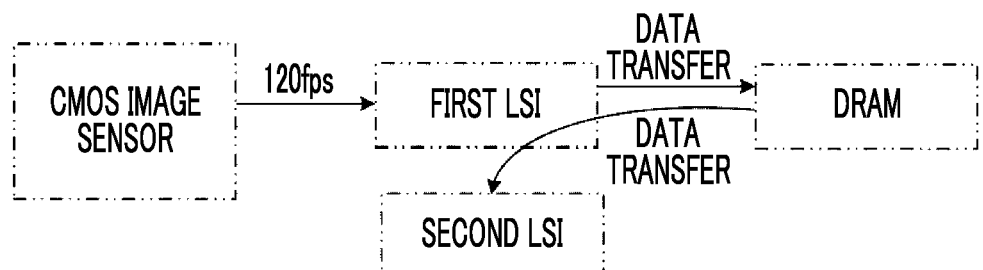
FIG. 17 is a conceptual diagram illustrating one example of a form of transfer of image data obtained by imaging a subject by a CMOS image sensor included in an imaging apparatus according to a technology in the related art.

As a method of reducing the processing load of the rear stage processing portion, for example, as illustrated in FIG. 17, a method of processing the image data in a distributed manner using a first large-scale integration (LSI) and a second LSI as the rear stage processing portion is considered.

In the example illustrated in FIG. 17, a complementary metal oxide semiconductor (CMOS) image sensor that is one example of the imaging element generates image data indicating an image of a subject by imaging the subject. The CMOS image sensor outputs the image data to the first LSI at 120 frames per second (fps) through a single output line. The first LSI stores the image data input from the CMOS image sensor in a DRAM. The first LSI reads out the image data from the DRAM and transfers the read image data to the second LSI using a serial communication technology such as PCI-express.

However, in this case, electric power consumption may be increased due to a processing load between the first LSI and the DRAM and a processing load between the first LSI and the second LSI. The embodiment described below is made in consideration of above matters.

Figure 1:
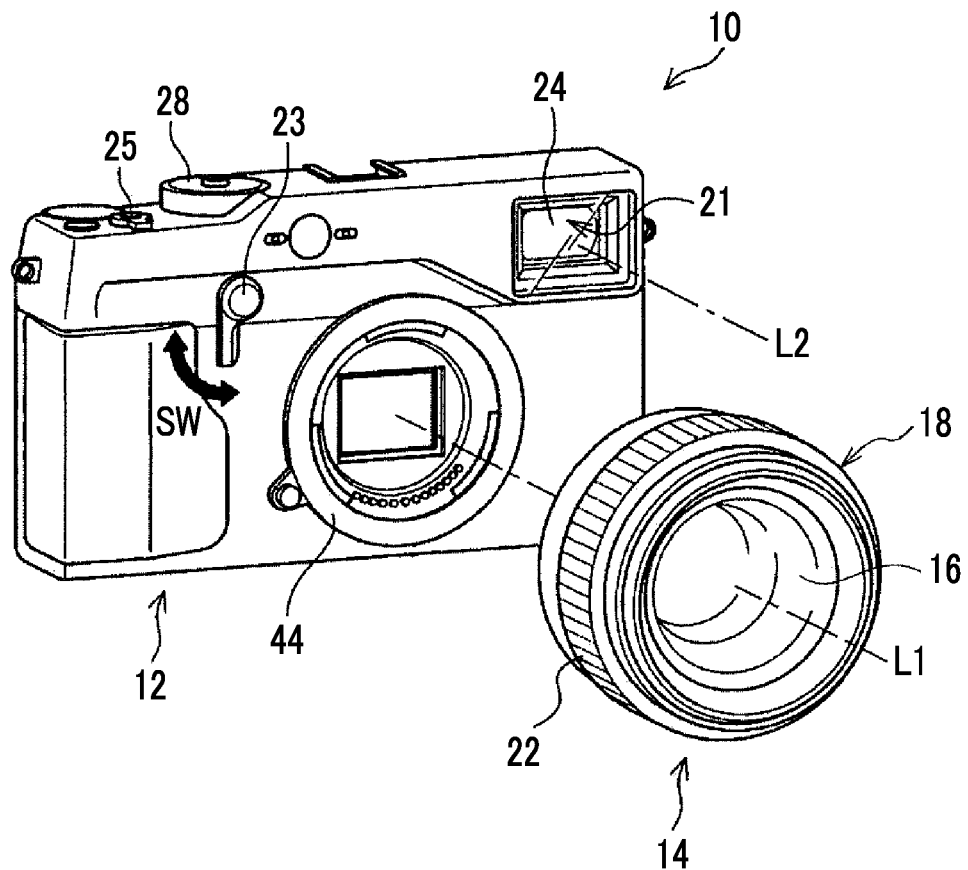
FIG. 1 is a perspective view illustrating one example of an exterior of an imaging apparatus that is an interchangeable lens camera according to an embodiment.

As illustrated in FIG. 1, an imaging apparatus 10 is an interchangeable lens camera. The imaging apparatus 10 is a digital camera that includes an imaging apparatus main body 12 and an interchangeable lens 14 interchangeably mounted on the imaging apparatus main body 12, and that does not include a reflex mirror. The interchangeable lens 14 includes an imaging lens 18 including a focus lens 16 that is movable in an optical axis direction by a manual operation.

A hybrid finder (registered trademark) 21 is disposed in the imaging apparatus main body 12. For example, the hybrid finder 21 here refers to a finder in which an optical view finder (hereinafter, referred to as the OVF) and an electronic view finder (hereinafter, referred to as the EVF) are selectively used. The abbreviation OVF refers to "Optical View Finder". The abbreviation EVF refers to "Electronic View Finder".

The interchangeable lens 14 is interchangeably mounted on the imaging apparatus main body 12. A focus ring 22 that is used in a case where the imaging apparatus 10 is in a manual focus mode is disposed in a lens barrel of the interchangeable lens 14. The focus lens 16 moves in the optical axis direction in accordance with a manual rotation operation of the focus ring 22, and an image of subject light is formed on an imaging element 20 (refer to FIG. 3), described later, at a focal position corresponding to a subject distance.

A finder window 24 of the OVF included in the hybrid finder 21 is disposed on a front surface of the imaging apparatus main body 12. In addition, a finder switching lever 23 is disposed on the front surface of the imaging apparatus main body 12. An optical image visually recognizable by the OVF and a live view image that is an electronic image visually recognizable by the EVF are switched by rotationally moving the finder switching lever 23 in a direction of arrow SW. The "live view image" here refers to a motion picture image for displaying obtained by imaging by a photoelectric conversion element. The live view image is generally referred to as a live preview image.

A release button 25 and a dial 28 for setting a mode of an imaging system, a mode of a playback system, and the like are disposed on an upper surface of the imaging apparatus main body 12.

The release button 25 functions as an imaging preparation instruction portion and an imaging instruction portion, and a push operation of two stages of an imaging preparation instruction state and an imaging instruction state can be detected. For example, the imaging preparation instruction state refers to a state where a push is performed to an intermediate position (half push position) from a standby position, and the imaging instruction state refers to a state where a push is performed to a final push position (full push position) exceeding the intermediate position. Hereinafter, the "state where a push is performed to the half push position from the standby position" will be referred to as a "half push state", and the "state where a push is performed to the full push position from the standby position" will be referred to as a "full push state".

In the imaging apparatus 10, an imaging mode and a playback mode are selectively set as an operation mode in accordance with an instruction of a user. The imaging mode is broadly divided into a display imaging mode and a recording imaging mode.

The display imaging mode is an operation mode in which the live view image based on display image data of a plurality of consecutive frames obtained by consecutive imaging is displayed on a first display 40 and/or a second display 80 (refer to FIG. 3) described later. The display image data is image data for the live view image and is generated by a first processing circuit 100 (refer to FIG. 3) described later based on captured image data indicating an image of a subject. The captured image data refers to image data obtained by imaging the subject by a photoelectric conversion element 92 (refer to FIG. 6) described later. Hereinafter, for convenience of description, the image indicated by the captured image data will be referred to as a "captured image".

The recording imaging mode is an operation mode in which the live view image is displayed on the first display 40 and/or the second display 80 described later, and in which recording image data is recorded in a recording apparatus 218 (refer to FIG. 5) described later. The recording image data is broadly divided into still picture image data and motion picture image data and is generated by a processing circuit 94 described later based on the captured image data.

In a case where the imaging mode is set, first, the imaging apparatus 10 is set to the display imaging mode. In the display imaging mode, in a case where the release button 25 is subjected to the push operation, the imaging apparatus 10 transitions to the recording imaging mode from the display imaging mode. A case where the release button 25 is subjected to the push operation refers to a case of the half push state and a case of the full push state.

In the imaging mode, the manual focus mode and an auto focus mode are selectively set in accordance with an instruction of the user. In the auto focus mode, an imaging condition is adjusted by setting the release button 25 to the half push state. Then, in a case where the full push state is subsequently set, exposure is performed. That is, after an exposure state is set by an automatic exposure (AE) function by setting the release button 25 to the half push state, a focusing control is performed by an auto-focus (AF) function. In a case where the release button 25 is set to the full push state, imaging is performed.

Figure 2:
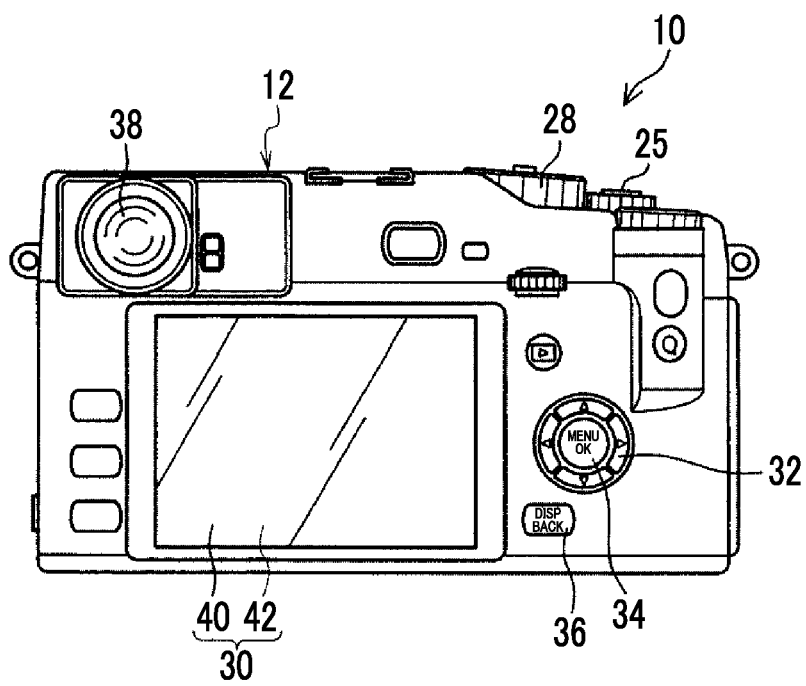
FIG. 2 is a rear view illustrating a rear surface side of the imaging apparatus according to the embodiment.

For example, as illustrated in FIG. 2, a touch panel display 30, a cross key 32, a menu key 34, an instruction button 36, and a finder eyepiece portion 38 are disposed on a rear surface of the imaging apparatus main body 12.

Figure 3:
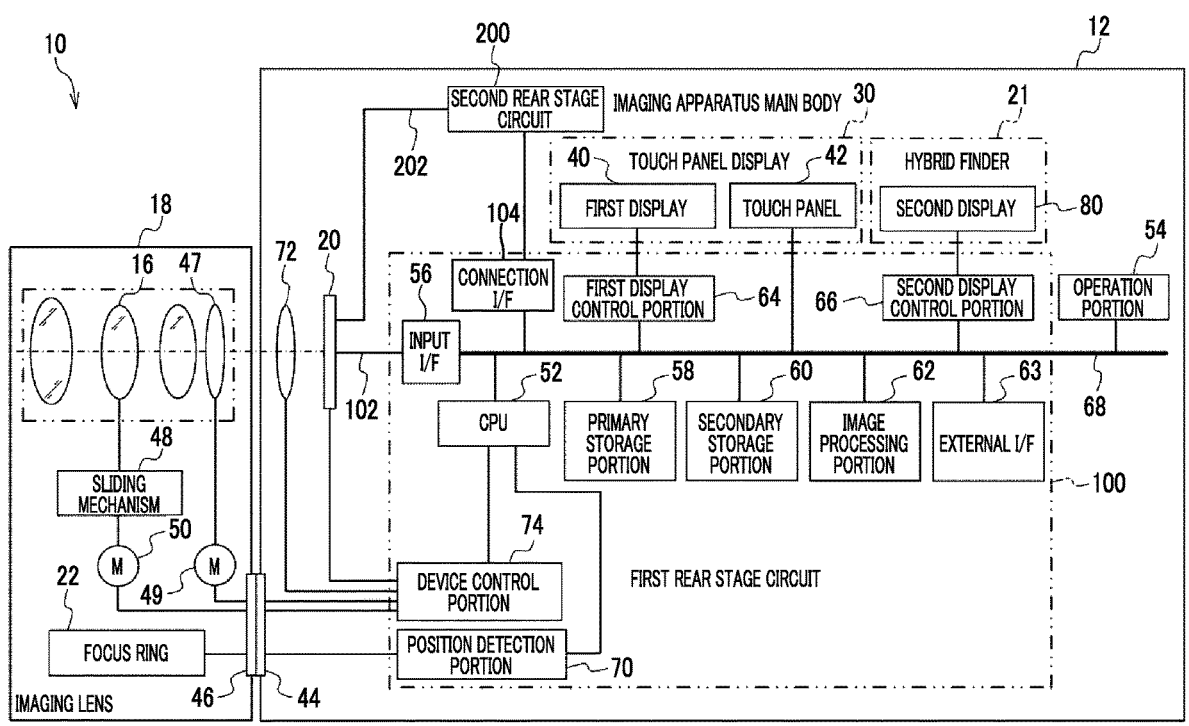
FIG. 3 is a block diagram illustrating one example of a hardware configuration of the imaging apparatus according to the embodiment.

The touch panel display 30 comprises a first display 40 and a touch panel 42 (refer to FIG. 3). A liquid crystal display or an organic electro-luminescence (EL) display is illustrated as the first display 40.

The first display 40 displays an image, text information, and the like. The first display 40 is used for displaying the live view image which is obtained by consecutive imaging in a case where the imaging apparatus 10 is in the imaging mode. In addition, the first display 40 is used for displaying a still picture image that is one example of the captured image of a single frame obtained by imaging in a case where a still picture imaging instruction is provided. Furthermore, the first display 40 is used for displaying a playback image and displaying a menu screen and the like in a case where the imaging apparatus 10 is in the playback mode.

The touch panel 42 is a transmissive touch panel and is overlaid on a surface of a display region of the first display 40. The touch panel 42 detects a contact of an instruction object such as a finger or a stylus pen. The touch panel 42 outputs detection result information indicating a detection result (presence or absence of the contact of the instruction object with the touch panel 42) to a predetermined output destination (for example, a CPU 52 (refer to FIG. 3) described later) in a predetermined cycle (for example, 100 milliseconds). In a case where the touch panel 42 detects the contact of the instruction object, the detection result information includes two-dimensional coordinates (hereinafter, referred to as the "coordinates") capable of specifying a contact position of the instruction object on the touch panel 42. In a case where the touch panel 42 does not detect the contact of the instruction object, the detection result information does not include the coordinates.

The cross key 32 has a function as a multifunction key that outputs various instruction signals for selecting one or a plurality of menus, zooming, frame advance, and the like. The menu key 34 is an operation key that has both of a function as a menu button for providing an instruction to display one or a plurality of menus on a screen of the first display 40 and a function as an instruction button for providing an instruction for confirmation, execution, and the like of a selected content. The instruction button 36 is operated in a case of deleting a selected item or the like, a case of canceling a designated content, a case of returning to an immediately previous operation state, and the like.

The imaging apparatus 10 has a still picture imaging mode and a motion picture imaging mode as the recording imaging mode. The still picture imaging mode is an operation mode in which the still picture image obtained by imaging the subject by the imaging apparatus 10 is recorded, and the motion picture imaging mode is an operation mode in which the motion picture image obtained by imaging the subject by the imaging apparatus 10 is recorded.

For example, as illustrated in FIG. 3, the imaging apparatus 10 includes a mount 44 (refer to FIG. 1) comprised in the imaging apparatus main body 12, and a mount 46 on an interchangeable lens 14 side corresponding to the mount 44. The interchangeable lens 14 is interchangeably mounted on the imaging apparatus main body 12 by joining the mount 46 to the mount 44.

The imaging lens 18 includes a stop 47 and a motor 49. The stop 47 is arranged on an imaging apparatus main body 12 side of the focus lens 16 and is connected to the motor 49. The stop 47 operates to adjust the exposure by receiving motive power of the motor 49.

The imaging lens 18 includes a sliding mechanism 48 and a motor 50. Operating the focus ring 22 causes the sliding mechanism 48 to move the focus lens 16 along an optical axis L1. The focus lens 16 is attached to the sliding mechanism 48 in a slidable manner along the optical axis L1. The motor 50 is connected to the sliding mechanism 48, and the sliding mechanism 48 slides the focus lens 16 along the optical axis L1 by receiving motive power of the motor 50.

The motors 49 and 50 are connected to the imaging apparatus main body 12 through the mounts 44 and 46, and driving thereof is controlled in accordance with a command from the imaging apparatus main body 12. In the present embodiment, stepping motors are applied as one example of the motors 49 and 50. Accordingly, the motors 49 and 50 operate in synchronization with pulse electric power in accordance with the command from the imaging apparatus main body 12. While an example in which the motors 49 and 50 are disposed in the imaging lens 18 is illustrated in the example illustrated in FIG. 3, the technology of the present disclosure is not limited thereto, and at least one of the motor 49 or the motor 50 may be disposed in the imaging apparatus main body 12.

The imaging apparatus 10 is a digital camera that records the still picture image and the motion picture image obtained by imaging the subject. The imaging apparatus main body 12 comprises an operation portion 54, a first rear stage circuit 100, and a second rear stage circuit 200. The first rear stage circuit 100 is one example of a "first signal processing portion" according to the embodiment of the technology of the present disclosure. The second rear stage circuit 200 is one example of a "second signal processing portion" according to the embodiment of the technology of the present disclosure.

The operation portion 54 is a user interface that is operated by the user in a case of providing various instructions to the first rear stage circuit 100. The operation portion 54 includes the release button 25, the dial 28, the finder switching lever 23, the cross key 32, the menu key 34, and the instruction button 36. Various instructions received by the operation portion 54 are output to the CPU 52 as an operation content signal, and the CPU 52 executes processing corresponding to the operation content signal input from the operation portion 54.

Both of the first rear stage circuit 100 and the second rear stage circuit 200 are circuits on a side of receiving data transmitted from the imaging element 20. The first rear stage circuit 100 is connected to the imaging element 20 through a first output line 102, receives data transmitted from the imaging element 20 through the first output line 102, and performs various types of processing on the received data. The second rear stage circuit 200 is connected to the imaging element 20 through a second output line 202, receives data transmitted from the imaging element 20 through the second output line 202, and performs various types of processing on the received data.

Hereinafter, for convenience of description, the first rear stage circuit 100 and the second rear stage circuit 200 will be simply referred to as a "rear stage circuit" without a reference sign unless otherwise necessary to distinguish therebetween for description. In the present embodiment, an integrated circuit (IC) is employed as the rear stage circuit. An LSI is illustrated as one example of the IC.

The first rear stage circuit 100 includes the central processing unit (CPU) 52, an input interface (I/F) 56, a primary storage portion 58, a secondary storage portion 60, an image processing portion 62, an external I/F 63, a first display control portion 64, a second display control portion 66, a position detection portion 70, a device control portion 74, and a connection I/F 104. A single CPU is illustrated as the CPU 52 in the present embodiment. However, the technology of the present disclosure is not limited thereto, and a plurality of CPUs may be employed instead of the CPU 52. That is, various types of processing executed by the CPU 52 may be executed by one processor or a plurality of physically separated processors.

In the present embodiment, each of the image processing portion 62, the first display control portion 64, the second display control portion 66, the position detection portion 70, and the device control portion 74 is implemented by an application specific integrated circuit (ASIC). However, the technology of the present disclosure is not limited thereto. For example, instead of the ASIC, at least one of a programmable logic device (PLD) or a field-programmable gate array (FPGA) may be employed. Alternatively, at least one of the ASIC, the PLD, or the FPGA may be employed. Alternatively, a computer including a CPU, a read only memory (ROM), and a random access memory (RAM) may be employed. The CPU may be a single CPU or a plurality of CPUs. In addition, at least one of the image processing portion 62, the first display control portion 64, the second display control portion 66, the position detection portion 70, or the device control portion 74 may be implemented by a combination of a hardware configuration and a software configuration.

The CPU 52, the touch panel 42, the input I/F 56, the primary storage portion 58, the secondary storage portion 60, the image processing portion 62, the external I/F 63, the first display control portion 64, the second display control portion 66, the connection I/F 104, and the operation portion 54 are connected to each other through a bus 68.

The CPU 52 controls the entire first rear stage circuit 100. In the imaging apparatus 10 according to the present embodiment, in a case where the imaging apparatus 10 is in the auto focus mode, the CPU 52 performs the focusing control by controlling driving of the motor 50 such that a contrast value of the image obtained by imaging is maximized. In addition, in a case where the imaging apparatus 10 is in the auto focus mode, the CPU 52 calculates AE information that is a physical quantity indicating brightness of the image obtained by imaging. In a case where the release button 25 is set to the half push state, the CPU 52 derives a shutter speed and an F number corresponding to the brightness of the image indicated by the AE information. The CPU 52 sets the exposure state by controlling each related portion to achieve the derived shutter speed and the F number.

The primary storage portion 58 means a volatile memory and refers to, for example, a RAM. The secondary storage portion 60 means a non-volatile memory and refers to, for example, a flash memory or a hard disk drive (HDD).

The secondary storage portion 60 stores various programs. The CPU 52 reads out various programs from the secondary storage portion 60 and loads the read various programs into the primary storage portion 58. The CPU 52 controls the entire first rear stage circuit 100 in accordance with the various programs loaded in the primary storage portion 58.

The input I/F 56 is connected to the imaging element 20 through the first output line 102. The display image data based on the captured image data is input into the input I/F 56 from the imaging element 20.

The CPU 52 acquires the display image data from the imaging element 20 through the input I/F 56 and outputs the acquired display image data to the image processing portion 62.

The image processing portion 62 performs signal processing on the display image data input from the CPU 52 and outputs the display image data subjected to the signal processing to the first display control portion 64 and/or the second display control portion 66 under control of the CPU 52.

The first display control portion 64 is connected to the first display 40 and displays an image or the like based on the display image data on the first display 40. The second display control portion 66 is connected to the second display 80 and displays the image or the like based on the display image data on the second display 80. A liquid crystal display or an organic EL display is illustrated as the second display 80.

In the following description, for convenience of description, the first rear stage circuit 100 will be assumed to display the motion picture image such as the live view image on the first display 40 and the second display 80 at 120 fps.

The external I/F 63 is connected to an external display apparatus (not illustrated). For example, a display-equipped smart device and/or a display-equipped personal computer (PC) is illustrated as the external display apparatus.

The connection I/F 104 is connected to the second rear stage circuit 200, and the CPU 52 inputs and outputs various information into and from the second rear stage circuit 200 through the connection I/F 104. For example, the input and output of various information include input of a playback image signal indicating the playback image from the second rear stage circuit 200, and output of instruction content signals indicating contents of various instructions received by the touch panel 42 and/or the operation portion 54 to the second rear stage circuit 200.

The position detection portion 70 is connected to the CPU 52. The position detection portion 70 is connected to the focus ring 22 through the mounts 44 and 46, detects a rotation angle of the focus ring 22, and outputs rotation angle information indicating the rotation angle that is a detection result to the CPU 52. The CPU 52 executes processing corresponding to the rotation angle information input from the position detection portion 70.

In a case where the imaging mode is set, image light showing the subject is formed on a light receiving surface of the color imaging element 20 through the imaging lens 18 including the focus lens 16 movable by a manual operation, and a mechanical shutter 72.

The device control portion 74 is connected to the CPU 52. In addition, the device control portion 74 is connected to the imaging element 20 and the mechanical shutter 72. Furthermore, the device control portion 74 is connected to the motors 49 and 50 of the imaging lens 18 through the mounts 44 and 46.

The device control portion 74 controls the imaging element 20, the mechanical shutter 72, and the motors 49 and 50 under control of the CPU 52.

Figure 4:
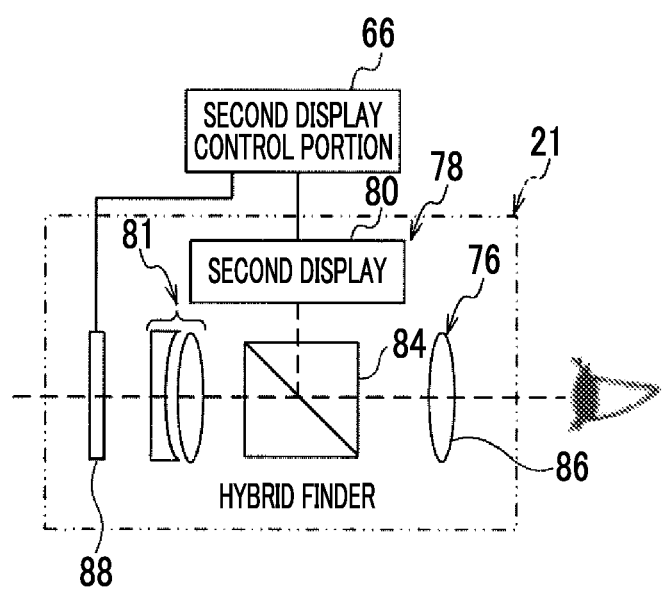
FIG. 4 is a schematic configuration diagram illustrating one example of a configuration of a hybrid finder of the imaging apparatus according to the embodiment.

For example, as illustrated in FIG. 4, the hybrid finder 21 includes an OVF 76 and an EVF 78. The OVF 76 is a reverse Galilean finder including an objective lens 81 and an eyepiece lens 86, and the EVF 78 includes the second display 80, a prism 84, and the eyepiece lens 86.

A liquid crystal shutter 88 is arranged in front of the objective lens 81. The liquid crystal shutter 88 blocks light such that the optical image is not incident on the objective lens 81 in a case of using the EVF 78.

The prism 84 reflects and guides the electronic image or various information to be displayed on the second display 80 to the eyepiece lens 86 and combines the optical image with the electronic image and/or various information to be displayed on the second display 80.

In a case of the OVF mode, the second display control portion 66 enables the optical image to be visually recognized from the eyepiece lens 86 by controlling the liquid crystal shutter 88 to a non-light blocking state. In a case of the EVF mode, the second display control portion 66 enables only the electronic image displayed on the second display 80 to be visually recognized from the eyepiece lens 86 by controlling the liquid crystal shutter 88 to a light blocking state.

In the following description, for convenience of description, the first display 40 and the second display 80 will be referred to as the "display apparatus" without a reference sign unless otherwise necessary to distinguish therebetween. The display apparatus is one example of a "display portion" according to the embodiment of the technology of the present disclosure. In addition, hereinafter, for convenience of description, the first display control portion 64 and the second display control portion 66 will be referred to as a "display control portion" without a reference sign unless otherwise necessary to distinguish therebetween for description. The "display control portion" here is one example of a "control portion" according to the embodiment of the technology of the present disclosure.

Figure 5:
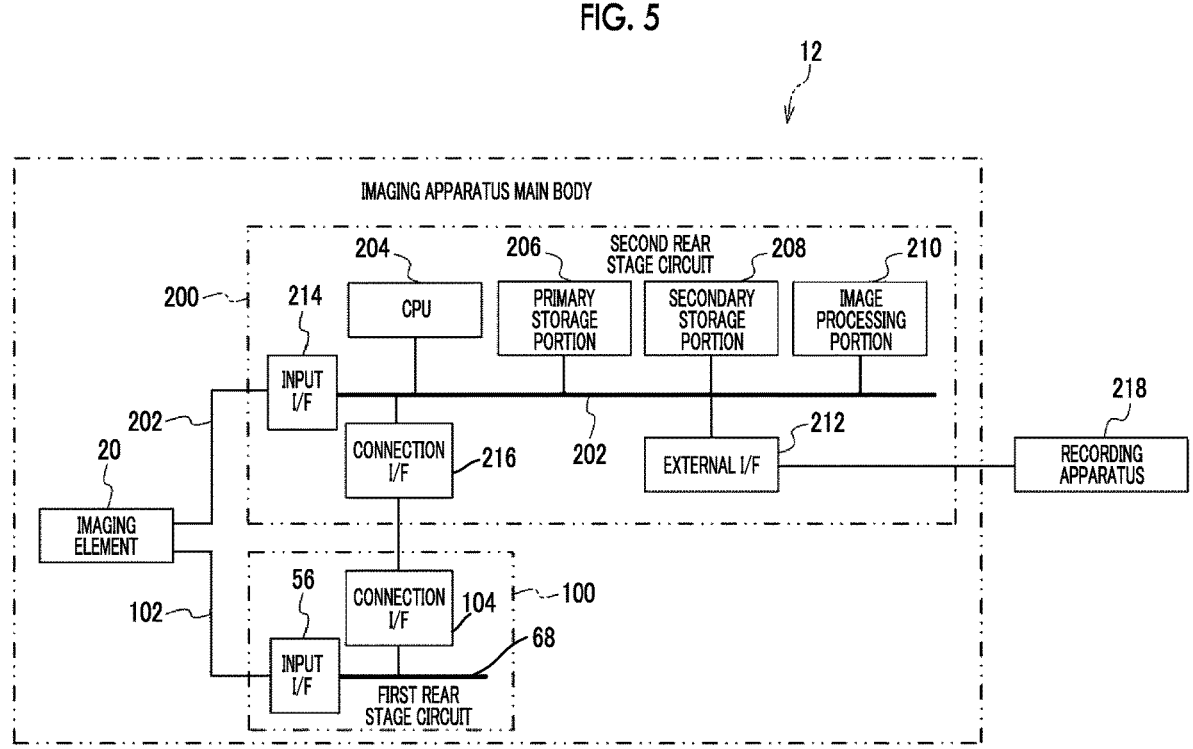
FIG. 5 is a block diagram illustrating one example of a hardware configuration of an imaging apparatus main body included in the imaging apparatus according to the embodiment.

For example, as illustrated in FIG. 5, the second rear stage circuit 200 includes a CPU 204, a primary storage portion 206, a secondary storage portion 208, an image processing portion 210, an external I/F 212, an input I/F 214, and a connection I/F 216. A single CPU is illustrated as the CPU 204 in the present embodiment. However, the technology of the present disclosure is not limited thereto, and a plurality of CPUs may be employed instead of the CPU 204. That is, various types of processing executed by the CPU 204 may be executed by one processor or a plurality of physically separated processors.

In the present embodiment, the image processing portion 210 is implemented by an ASIC. However, the technology of the present disclosure is not limited thereto. For example, at least one of a PLD or an FPGA may be employed instead of the ASIC. Alternatively, at least one of the ASIC, the PLD, or the FPGA may be employed. Alternatively, a computer including a CPU, a ROM, and a RAM may be employed. The CPU may be a single CPU or a plurality of CPUs. Alternatively, the image processing portion 210 may be implemented by a combination of a hardware configuration and a software configuration.

In the following description, for convenience of description, processing of the image data in the second rear stage circuit 200 will be assumed to be performed at 60 fps.

The CPU 204, the primary storage portion 206, the secondary storage portion 208, the image processing portion 210, the external I/F 212, the input I/F 214, and the connection I/F 216 are connected to each other through a bus 220.

The CPU 204 controls the entire second rear stage circuit 200. The primary storage portion 206 means a volatile memory and refers to, for example, a RAM. The secondary storage portion 208 means a non-volatile memory and refers to, for example, a flash memory or an HDD.

The secondary storage portion 208 stores various programs. The CPU 204 reads out various programs from the secondary storage portion 208 and loads the read various programs into the primary storage portion 206. The CPU 204 controls the entire second rear stage circuit 200 in accordance with the various programs loaded in the primary storage portion 206.

The input I/F 214 is connected to the imaging element 20 through the second output line 202. The recording image data based on the captured image data is input into the input I/F 214 from the imaging element 20.

The CPU 204 acquires the recording image data from the imaging element 20 through the input I/F 214 and outputs the acquired recording image data to the image processing portion 210.

The image processing portion 210 performs signal processing on the recording image data input from the CPU 204 and outputs the recording image data subjected to the signal processing to the secondary storage portion 208 and/or the external I/F 212 under control of the CPU 204. The secondary storage portion 208 stores the recording image data input from the image processing portion 210.

The external I/F 212 is connected to the recording apparatus 218. The recording apparatus 218 is an apparatus that records the image data. For example, a memory card, a smart device, a solid state drive (SSD), a universal serial bus (USB) memory, a PC, a server, and a printer are illustrated as the recording apparatus 218. The external I/F 212 outputs the recording image data input from the image processing portion 210 to the recording apparatus 218. The recording apparatus 218 records the recording image data input from the image processing portion 210 through the external I/F 212.

Figure 6:
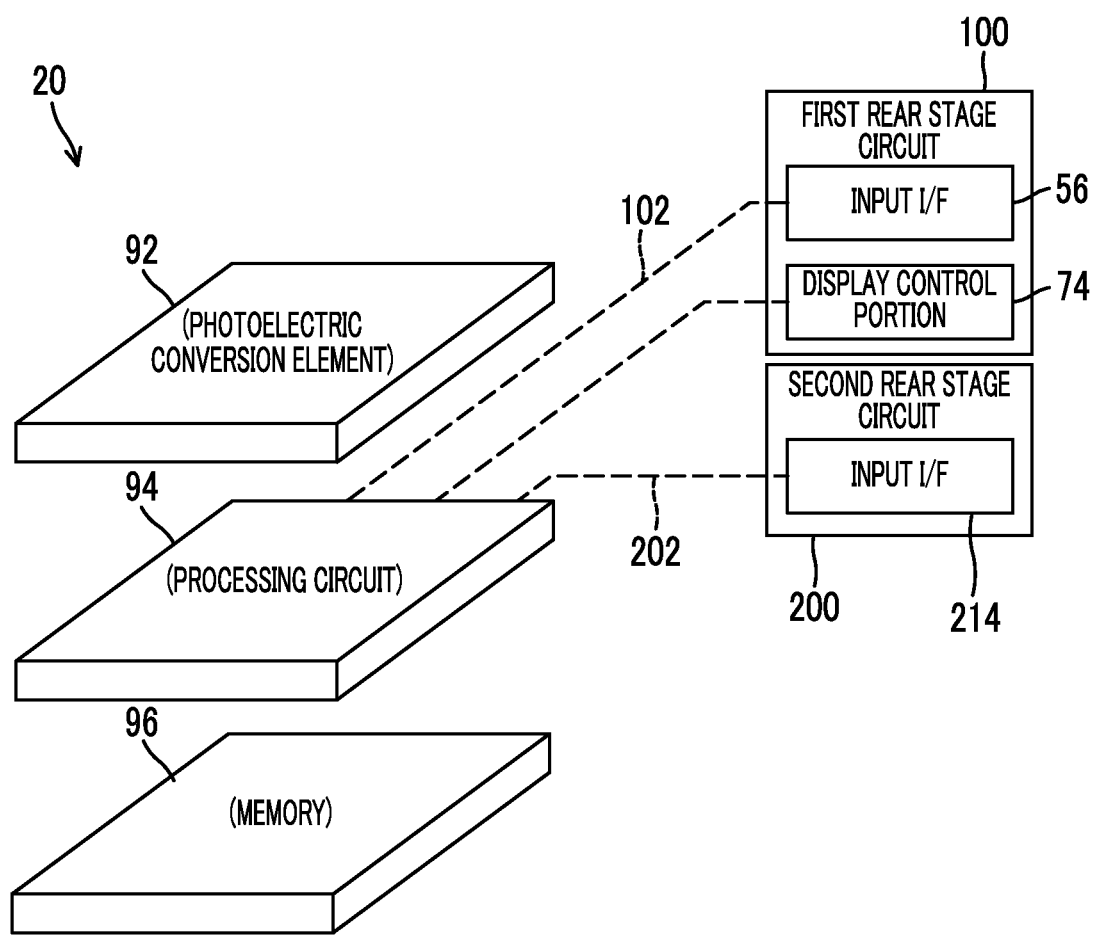
FIG. 6 is a schematic configuration diagram illustrating one example of a schematic configuration of an imaging element included in the imaging apparatus according to the embodiment.

The imaging element 20 is one example of a "laminated imaging element" according to the embodiment of the technology of the present disclosure. For example, the imaging element 20 is a CMOS image sensor. For example, as illustrated in FIG. 6, the imaging element 20 incorporates a photoelectric conversion element 92, a processing circuit 94, and a memory 96. In the imaging element 20, the photoelectric conversion element 92 is laminated with the processing circuit 94 and the memory 96. The memory 96 is one example of a storage portion according to the embodiment of the technology of the present disclosure.

The processing circuit 94 is, for example, an LSI, and the memory 96 is, for example, a RAM. In the present embodiment, a DRAM is employed as one example of the memory 96. However, the technology of the present disclosure is not limited thereto, and a static random access memory (SRAM) may be used.

In the present embodiment, the processing circuit 94 is implemented by an ASIC. However, the technology of the present disclosure is not limited thereto. For example, at least one of a PLD or an FPGA may be employed instead of the ASIC. Alternatively, at least one of the ASIC, the PLD, or the FPGA may be employed. Alternatively, a computer including a CPU, a ROM, and a RAM may be employed. The CPU may be a single CPU or a plurality of CPUs. Alternatively, the processing circuit 94 may be implemented by a combination of a hardware configuration and a software configuration.

The photoelectric conversion element 92 includes a plurality of photosensors arranged in a matrix form. In the present embodiment, photodiodes are employed as one example of the photosensors. Photodiodes of "4896×3265" pixels are illustrated as one example of the plurality of photosensors.

The photoelectric conversion element 92 comprises color filters, and the color filters include a G filter corresponding to green (G) that most contributes to obtaining a brightness signal, an R filter corresponding to red (R), and a B filter corresponding to blue (B). In the present embodiment, the G filter, the R filter, and the B filter are arranged with a predetermined periodicity in each of a row direction (horizontal direction) and a column direction (vertical direction) for the plurality of photodiodes of the photoelectric conversion element 92. Thus, the imaging apparatus 10 can perform processing in accordance with a repeating pattern in a case of performing demosaicing and the like on R, G, and B signals. The demosaicing refers to processing of calculating all color information for each pixel from a mosaic image corresponding to color filter arrangement of a single plate color imaging element. For example, in a case of an imaging element consisting of color filters of three colors of R, G, and B, the demosaicing means processing of calculating color information about all of R, G, and B for each pixel from a mosaic image consisting of R, G, and B.

While the CMOS image sensor is illustrated as the imaging element 20, the technology of the present disclosure is not limited thereto. For example, the technology of the present disclosure is also established in a case where the photoelectric conversion elements 92 is a charge coupled device (CCD) image sensor.

The imaging element 20 has a so-called electronic shutter function and controls an electric charge accumulation time period of each photodiode in the photoelectric conversion element 92 by performing the electronic shutter function under control of the device control portion 74. The electric charge accumulation time period refers to a so-called shutter speed.

In the imaging apparatus 10, imaging for the still picture image and imaging for the motion picture image are performed using a rolling shutter method. The imaging for the still picture image is implemented by performing the electronic shutter function and operating the mechanical shutter 72. The imaging for the live view image is implemented by performing the electronic shutter function without operating the mechanical shutter 72.

The processing circuit 94 is controlled by the device control portion 74. The processing circuit 94 reads out the captured image data obtained by imaging the subject by the photoelectric conversion element 92. The captured image data is signal electric charges accumulated in the photoelectric conversion element 92. The processing circuit 94 performs analog/digital (A/D) conversion on the captured image data read out from the photoelectric conversion element 92. The processing circuit 94 stores, in the memory 96, the captured image data obtained by performing the A/D conversion on the captured image data. The processing circuit 94 acquires the captured image data from the memory 96 and outputs, to the input I/F 56 of the first rear stage circuit 100 and the input I/F 214 of the second rear stage circuit 200, output image data that is image data based on the acquired captured image data. Hereinafter, for convenience of description, the "output image data that is image data based on the captured image data" will be simply referred to as the "output image data". In the present embodiment, the recording image data and the display image data are employed as one example of the output image data.

The processing circuit 94 performs first processing and second processing on the captured image data. The first processing refers to processing of generating the output image data by reading out the captured image data from the photoelectric conversion element 92, storing the read captured image data in the memory 96, acquiring the captured image data from the memory 96, and performing image processing on the acquired captured image data. The second processing refers to processing of outputting the output image data to an outside of the imaging element 20. For example, the "outside of the imaging element 20" here refers to the rear stage circuit.

In the imaging element 20, the subject is imaged at a first frame rate. The processing circuit 94 performs the first processing at the first frame rate and performs the second processing at a second frame rate that is one example of an output frame rate according to the embodiment of the technology of the present disclosure. In the present embodiment, 120 fps is employed as the first frame rate.

The second frame rate is broadly divided into a high frame rate and a low frame rate. The high frame rate refers to a frame rate higher than the low frame rate. In the present embodiment, 120 fps is employed as one example of the high frame rate, and 60 fps is employed as one example of the low frame rate.

Figure 7:
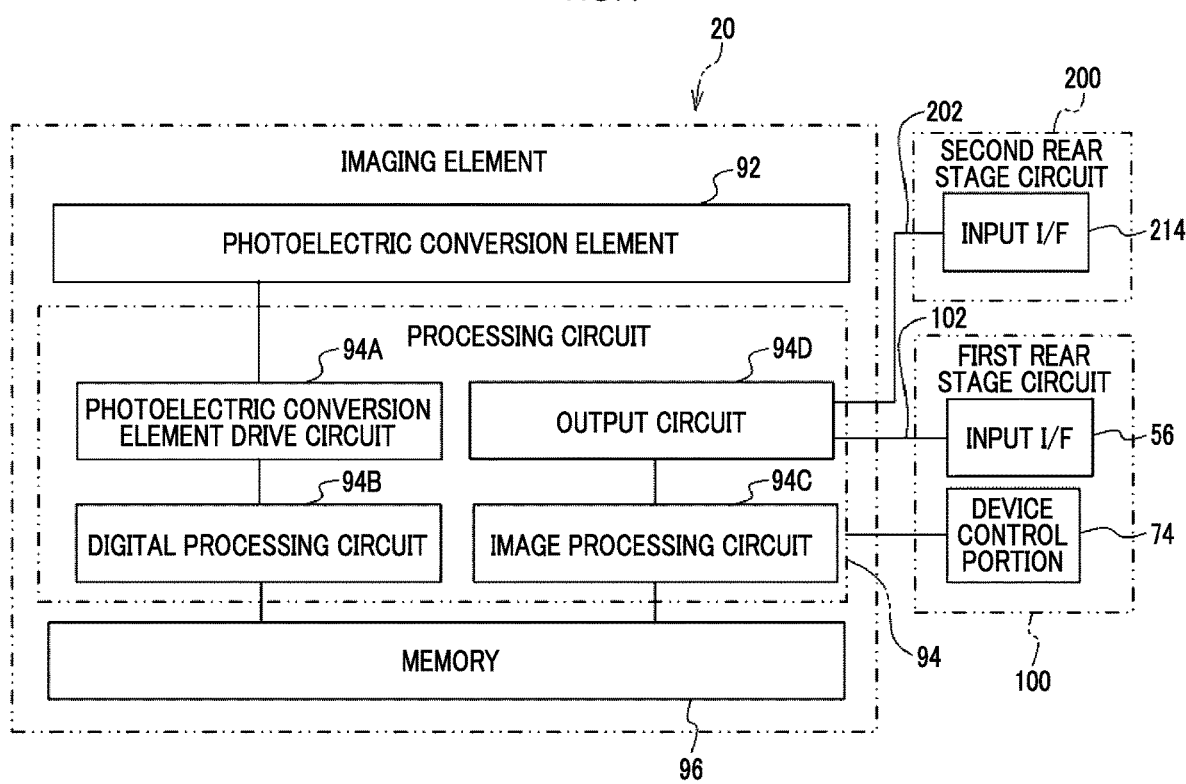
FIG. 7 is a block diagram illustrating one example of a main configuration of the imaging element included in the imaging apparatus according to the embodiment.

For example, as illustrated in FIG. 7, the processing circuit 94 includes a photoelectric conversion element drive circuit 94A, a digital processing circuit 94B, an image processing circuit 94C, and an output circuit 94D. The processing circuit 94 operates under control of the CPU 52 through the device control portion 74.

The photoelectric conversion element drive circuit 94A is connected to the photoelectric conversion element 92 and the digital processing circuit 94B. The memory 96 is connected to the digital processing circuit 94B and the image processing circuit 94C. The image processing circuit 94C is connected to the output circuit 94D and the memory 96. The output circuit 94D is connected to the input I/F 56 of the first rear stage circuit 100 through the first output line 102. In addition, the output circuit 94D is connected to the input I/F 214 of the second rear stage circuit 200 through the second output line 202.

The photoelectric conversion element drive circuit 94A controls the photoelectric conversion element 92 and reads out analog captured image data from the photoelectric conversion element 92 under control of the device control portion 74. The digital processing circuit 94B digitizes the analog captured image data read out by the photoelectric conversion element drive circuit 94A and stores the digitized captured image data in the memory 96. The memory 96 is a memory that can store the captured image data of a plurality of frames. The image processing circuit 94C acquires the captured image data from the memory 96 and performs signal processing on the acquired captured image data.

The captured image data is categorized into thinned captured image data indicating a thinned captured image and non-thinned captured image data indicating a non-thinned captured image.

The thinned captured image data is image data that is read out from the photoelectric conversion element 92 in an interlaced manner. The thinned captured image data is categorized into first thinned captured image data indicating a first thinned captured image and second thinned captured image data indicating a second thinned captured image. The first thinned captured image and the second thinned captured image are vertically ½ thinned images having alternating horizontal lines as pixel lines. The first thinned captured image and the second thinned captured image are vertically ½ thinned images having different horizontal lines as pixel lines. The "horizontal lines" here refer to lines of pixels that are horizontally arranged.

Figure 11:
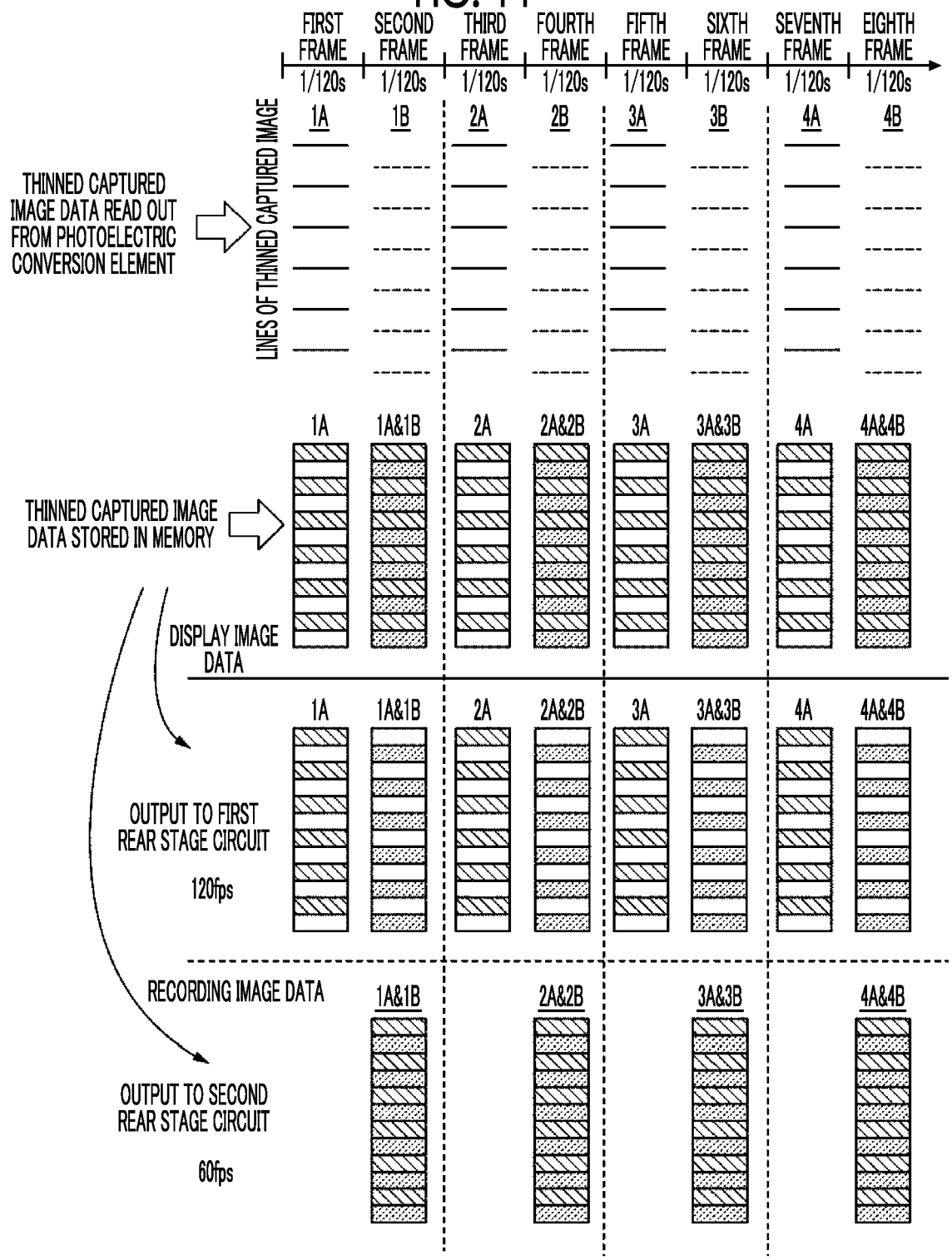
FIG. 11 is a state transition diagram illustrating one example of a flow of processing of image data.

For example, as illustrated in FIG. 11, the vertically ½ thinned image is an image obtained by thinning the horizontal lines of the image in the vertical direction by skipping one line at a time. In the example illustrated in FIG. 11, thinned lines of the vertically ½ thinned image of odd-numbered frames are different from thinned lines of the vertically ½ thinned image of even-numbered frames in the vertical direction. That is, in a case where a cycle of reading out two frames is set as one cycle, the vertically ½ thinned image is an image in which the horizontal lines are thinned in the vertical direction by shifting one line at a time for each frame in one cycle.

In the example illustrated in FIG. 11, the vertically ½ thinned image of the odd-numbered frames is the first thinned captured image, and the vertically ½ thinned image of the even-numbered frames is the second thinned captured image. In the present embodiment, an image in which odd-numbered horizontal lines in the vertical direction are thinned in the captured image is illustrated as one example of the first thinned captured image. An image in which even-numbered horizontal lines in the vertical direction are thinned in the captured image is illustrated as one example of the second thinned captured image.

The non-thinned captured image refers to an image in which pixels are not thinned. The non-thinned captured image is generated by combining the first thinned captured image with the second thinned captured image. That is, in a case where the first thinned captured image and the second thinned captured image in one cycle are set as one set of thinned images, the non-thinned captured image is obtained by incorporating the second thinned captured image at thinned positions of the first thinned captured image in one set.

In the example illustrated in FIG. 11, the first thinned captured image data of an m-th set in a case where m is a natural number is denoted by "mA", the second thinned captured image data of the m-th set is denoted by "mB", and the non-thinned captured image data is denoted by "mA & mB".

The image processing circuit 94C performs necessary signal processing on the thinned captured image data without changing the number of pixels and pixel positions and then, outputs the thinned captured image data subjected to the signal processing to the output circuit 94D as the display image data.

The image processing circuit 94C performs necessary signal processing on the non-thinned captured image data without changing the number of pixels and the pixel positions and then, outputs the non-thinned captured image data subjected to the signal processing to the output circuit 94D as the recording image data.

For example, as illustrated in Table 1, the output circuit 94D outputs the thinned captured image data input from the image processing circuit 94C to the input I/F 56 of the first rear stage circuit 100 through the first output line 102 at the high frame rate. In addition, the output circuit 94D outputs the non-thinned captured image data input from the image processing circuit 94C to the input I/F 214 of the second rear stage circuit 200 through the second output line 202 at the low frame rate. A data amount of the thinned captured image data and a data amount of the non-thinned captured image data illustrated in Table 1 below are one example of an "output data amount" according to the embodiment of the technology of the present disclosure.

TABLE 1

| Output Line | Second Frame Rate | Data Amount |
| --- | --- | --- |
| First Output Line | High Frame Rate | Small (Thinned Captured Image Data) |
| Second Output Line | Low Frame Rate | Large (Non-Thinned Captured Image Data) |

Next, actions of parts of the imaging apparatus 10 according to the embodiment of the technology of the present disclosure will be described. In the following description, for convenience of description, the number of bits per pixel of the display image data will be assumed to be the same as the number of bits per pixel of the recording image data.

First, display image data generation processing executed by the processing circuit 94 in a case where the imaging apparatus 10 is in the display imaging mode will be described with reference to FIG. 8. The display image data generation processing is executed at the first frame rate by the processing circuit 94. Here, for convenience of description, the first frame rate will be assumed to be 120 fps.

Figure 8:
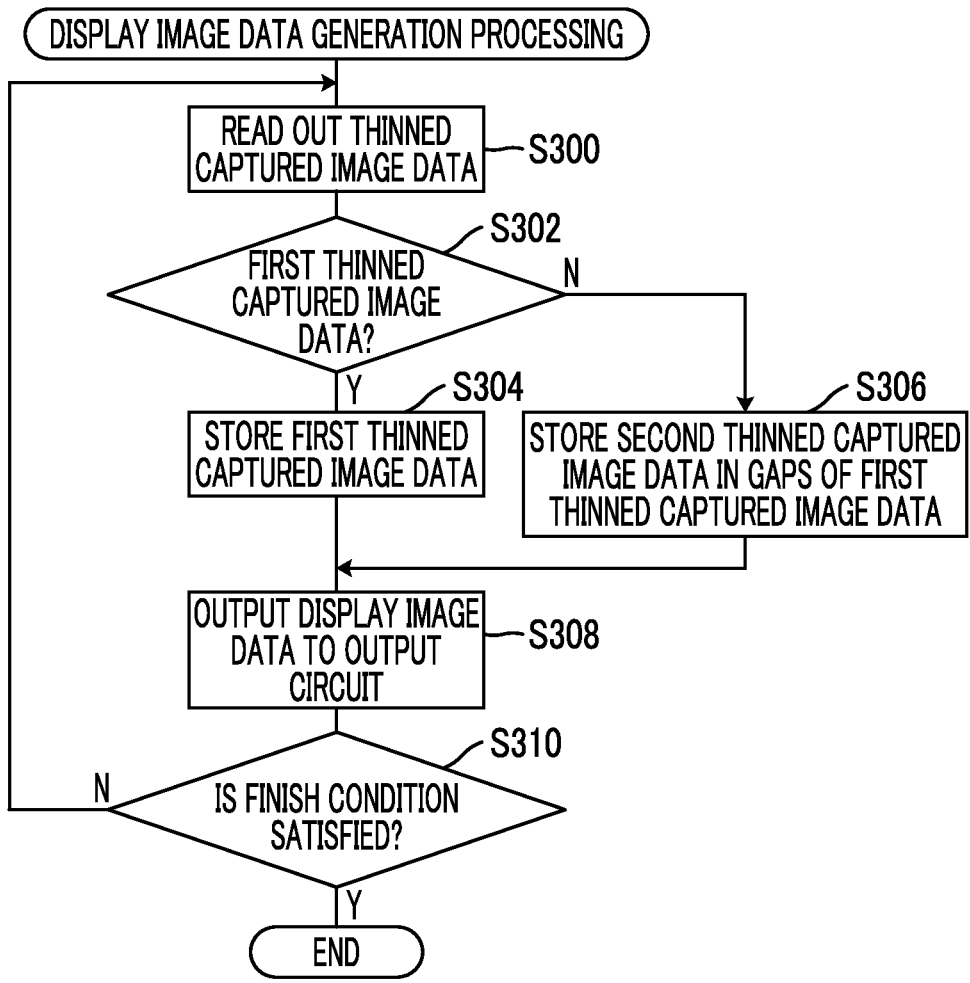
FIG. 8 is a flowchart illustrating one example of a flow of display image data generation processing according to the embodiment.

In the display image data generation processing illustrated in FIG. 8, first, in step S300, the photoelectric conversion element drive circuit 94A reads out the thinned captured image data from the photoelectric conversion element 92. Then, the display image data generation processing transitions to step S302.

In step S302, the processing circuit 94 determines whether or not the thinned captured image data read out in step S300 is the first thinned captured image data. In step S302, in a case where the thinned captured image data read out in step S300 is the first thinned captured image data, a positive determination is made, and the display image data generation processing transitions to step S304. In step S302, in a case where the thinned captured image data read out in step S300 is the second thinned captured image data, a negative determination is made, and the display image data generation processing transitions to step S306.

In step S304, the digital processing circuit 94B stores the first thinned captured image data read out in step S300 in the memory 96. Then, the display image data generation processing transitions to step S308.

In step S306, the digital processing circuit 94B stores the second thinned captured image data in gaps of the already stored first thinned captured image data in the memory 96. Then, the display image data generation processing transitions to step S308. The "gaps of the first thinned captured image data" refer to locations of thinned lines in the first thinned captured image data. In the present embodiment, the locations of the thinned lines in the first thinned captured image data refer to locations of the odd-numbered horizontal lines in the vertical direction in the captured image.

Accordingly, in step S306, for example, as illustrated in FIG. 11, the second thinned captured image data is stored in the memory 96 such that at the locations of the thinned horizontal lines in the first thinned captured image of the m-th set, horizontal lines at corresponding positions in the second thinned captured image of the same set are incorporated. The "horizontal lines at corresponding positions in the second thinned captured image" refer to locations of the even-numbered horizontal lines in the vertical direction in the captured image.

In step S308, the image processing circuit 94C reads out the most recent thinned captured image data stored in the memory 96 and outputs the read thinned captured image data to the output circuit 94D as the display image data. Then, the display image data generation processing transitions to step S310.

In step S308, the first thinned captured image data stored in the memory 96 in step S304 or the second thinned captured image data stored in the memory 96 in step S306 are read out as the most recent thinned captured image data stored in the memory 96.

In a case where the first thinned captured image data of the m-th set is output to the output circuit 94D by executing processing of step S308, the first thinned captured image data is stored in the memory 96. In a case where the second thinned captured image data of the m-th set is output to the output circuit 94D by executing processing of step S308, the first and second thinned captured image data of the m-th set are deleted from the memory 96 by the image processing circuit 94C. That is, after waiting for output of the second thinned captured image data of the same set to the output circuit 94D, the first thinned captured image data is deleted from the memory 96 together with the second thinned captured image data by the image processing circuit 94C.

In step S310, the processing circuit 94 determines whether or not a display image data generation processing finish condition that is a condition for finishing the display image data generation processing is satisfied. For example, a condition that an instruction to finish the display image data generation processing is received by the touch panel 42 and/or the operation portion 54 is illustrated as the display image data generation processing finish condition. Alternatively, for example, a condition that a predetermined time period exceeds from a start of the display image data generation processing without pushing the release button 25 is illustrated as the display image data generation processing finish condition. For example, the "predetermined time period" here is five minutes. The predetermined time period may be a fixed value or a variable value that can be changed in accordance with an instruction provided from the user.

In step S310, in a case where the display image data generation processing finish condition is not satisfied, a negative determination is made, and the display image data generation processing transitions to step S300. In step S310, in a case where the display image data generation processing finish condition is satisfied, a positive determination is made, and the processing circuit 94 finishes the display image data generation processing.

Next, recording image data generation processing executed by the processing circuit 94 in a case where the imaging for the still picture image is performed in a state where the imaging mode is set will be described with reference to FIG. 9. The recording image data generation processing is executed at the first frame rate by the processing circuit 94. Here, for convenience of description, the first frame rate will be assumed to be 120 fps.

Figure 9:
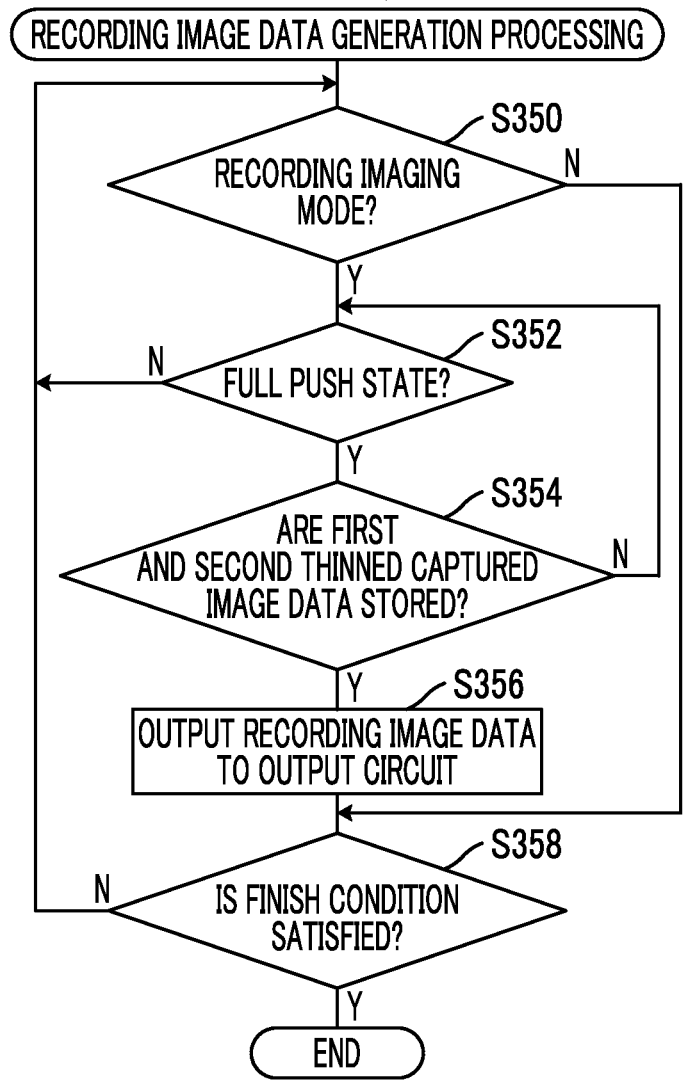
FIG. 9 is a flowchart illustrating one example of a flow of recording image data generation processing according to the embodiment.

In the recording image data generation processing illustrated in FIG. 9, first, in step S350, the image processing circuit 94C determines whether or not the imaging mode is the recording imaging mode. In step S350, in a case where the imaging mode is the display imaging mode, a negative determination is made, and the recording image data generation processing transitions to step S358. In step S350, in a case where the imaging mode is the recording imaging mode, a positive determination is made, and the recording image data generation processing transitions to step S352.

In step S352, the image processing circuit 94C determines whether or not the release button 25 is in the full push state. In step S352, in a case where the release button 25 is not in the full push state, a negative determination is made, and the recording image data generation processing transitions to step S350. In step S352, in a case where the release button 25 is in the full push state, a positive determination is made, and the recording image data generation processing transitions to step S354.

In step S354, the image processing circuit 94C determines whether or not the first thinned captured image data and the second thinned captured image data are stored in the memory 96. In step S354, in a case where the first thinned captured image data and the second thinned captured image data are not stored in the memory 96, a negative determination is made, and the recording image data generation processing transitions to step S352. In step S354, in a case where the first thinned captured image data and the second thinned captured image data are stored in the memory 96, a positive determination is made, and the recording image data generation processing transitions to step S356.

In step S356, the image processing circuit 94C reads out, from the memory 96, the first and second thinned captured image data currently stored in the memory 96. The non-thinned captured image data is generated by incorporating the second thinned captured image data into the first thinned captured image data. In step S356, the image processing circuit 94C outputs the non-thinned captured image data to the output circuit 94D as the recording image data. Then, the recording image data generation processing transitions to step S358.

The first and second thinned captured image data currently stored in the memory 96 refer to the first and second thinned captured image data that are currently stored in the memory 96 by executing processing of step S306 included in the display image data generation processing.

In step S358, the processing circuit 94 determines whether or not a recording image data generation processing finish condition that is a condition for finishing the recording image data generation processing is satisfied. For example, a condition that an instruction to finish the recording image data generation processing is received by the touch panel 42 and/or the operation portion 54 is illustrated as the recording image data generation processing finish condition. Alternatively, for example, a condition that the predetermined time period exceeds from a start of the recording image data generation processing without pushing the release button 25 is illustrated as the recording image data generation processing finish condition.

In step S358, in a case where the recording image data generation processing finish condition is not satisfied, a negative determination is made, and the recording image data generation processing transitions to step S350. In step S358, in a case where the recording image data generation processing finish condition is satisfied, a positive determination is made, and the processing circuit 94 finishes the recording image data generation processing.

Next, output circuit processing executed by the output circuit 94D will be described with reference to FIG. 10.

Figure 10:
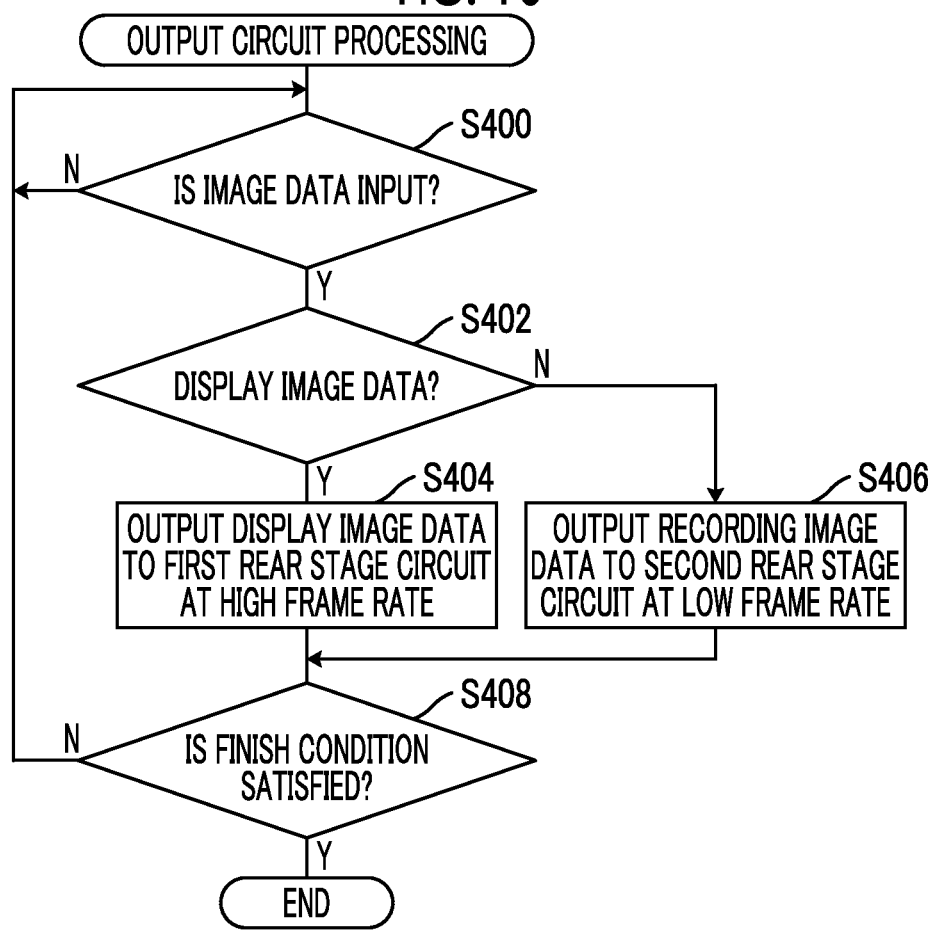
FIG. 10 is a flowchart illustrating one example of a flow of output circuit processing according to the embodiment.

In the output circuit processing illustrated in FIG. 10, first, in step S400, the output circuit 94D determines whether or not the image data is input from the image processing circuit 94C. In step S400, in a case where the image data is not input, a negative determination is made, and the determination of step S400 is performed again. In step S400, in a case where the image data is input, a positive determination is made, and the output circuit processing transitions to step S402.

In step S402, the output circuit 94D determines whether or not the image data input from the image processing circuit 94C is the display image data. In step S402, in a case where the image data input from the image processing circuit 94C is the display image data, a positive determination is made, and the output circuit processing transitions to step S404. In step S402, in a case where the image data input from the image processing circuit 94C is the recording image data, a negative determination is made, and the output circuit processing transitions to step S406.

In step S404, the output circuit 94D outputs the display image data to the input I/F 56 of the first rear stage circuit 100 at the high frame rate. Then, the output circuit processing transitions to step S408. The "high frame rate" here is 120 fps.

That is, the display image data generation processing is executed at 120 fps, and the display image data is output to the output circuit 94D at 120 fps. Thus, in step S404, for example, as illustrated in FIG. 11, the display image data is output to the first rear stage circuit 100 at 120 fps.

In step S406, the output circuit 94D outputs the recording image data to the input I/F 214 of the second rear stage circuit 200 at the low frame rate. Then, the output circuit processing transitions to step S408. The "low frame rate" here is 60 fps.

After waiting for preparation of one set of the first thinned captured image data and the second thinned captured image data, the recording image data output by executing processing of step S356 of the recording image data generation processing is output to the output circuit 94D from the image processing circuit 94C. Thus, since the frame rate of the imaging element 20 is 120 fps, 1/60 second (s) is required in order to prepare one set of the first thinned captured image data and the second thinned captured image data. Accordingly, in step S406, for example, as illustrated in FIG. 11, the recording image data is output to the second rear stage circuit 200 at 60 fps.

In step S408, the output circuit 94D determines whether or not an output circuit processing finish condition that is a condition for finishing the output circuit processing is satisfied. For example, a condition that an instruction to finish the output circuit processing is received by the touch panel 42 and/or the operation portion 54 is illustrated as the output circuit processing finish condition. In addition, for example, a condition that the predetermined time period exceeds from a start of the output circuit processing without pushing the release button 25 is illustrated as the output circuit processing finish condition.

In step S408, in a case where the output circuit processing finish condition is not satisfied, a negative determination is made, and the output circuit processing transitions to step S400. In step S408, in a case where the output circuit processing finish condition is satisfied, a positive determination is made, and the output circuit 94D finishes the output circuit processing.

Figure 12:
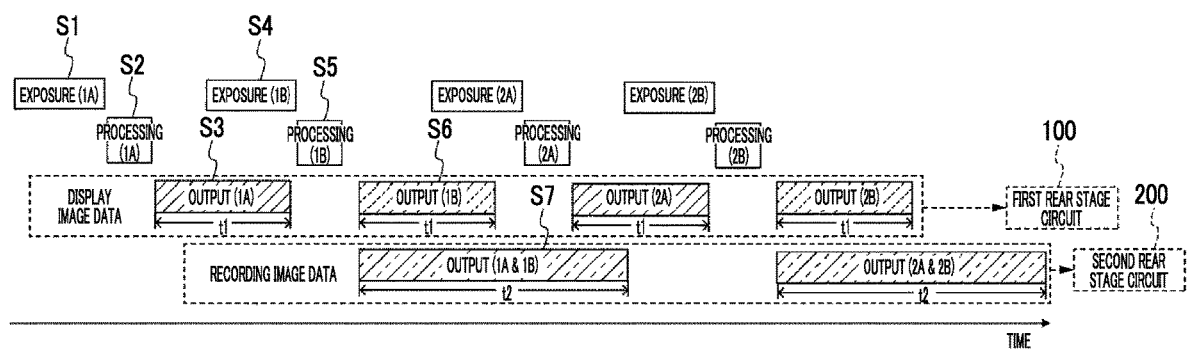
FIG. 12 is a time chart illustrating one example of sequential processing executed by the imaging apparatus according to the embodiment.

For example, sequential processing illustrated in FIG. 12 is executed by executing the display image data generation processing illustrated in FIG. 8, the recording image data generation processing illustrated in FIG. 9, and the output circuit processing illustrated in FIG. 10 by the processing circuit 94.

Image data of a first set and image data of a second set are illustrated in FIG. 12. Image data of a third set and later is the same as the image data of the first set and the image data of the second set and thus, is not illustrated.

The first set refers to a set of a first frame and a second frame, and the second set refers to a set of a third frame and a fourth frame. The image data of the first set refers to the first thinned captured image data (1A), the second thinned captured image data (1B), the display image data (1A and 1B), and the recording image data (1A & 1B) of the first set. The image data of the second set refers to the first thinned captured image data (2A), the second thinned captured image data (2B), the display image data (2A and 2B), and the recording image data (2A & 2B) of the second set.

The sequential processing illustrated in FIG. 12 will be described using the image data of the first set as an example. First, in a case where the imaging mode is set, in step S1, exposure of the first frame is performed by the photoelectric conversion element 92. After the exposure of the first frame is performed, in step S2, various types of processing is performed on the first frame by the processing circuit 94. That is, in step S2, the processing circuit 94 reads out the first thinned captured image data (1A) of the first frame from the photoelectric conversion element 92, stores the read first thinned captured image data (1A) of the first frame in the memory 96, and acquires the first thinned captured image data (1A) of the first frame from the memory 96. In step S3, the processing circuit 94 outputs the first thinned captured image data (1A) of the first frame acquired from the memory 96 to the first rear stage circuit 100 as the display image data of the first frame.

In step S4, exposure of the second frame is performed during the output of the display image data (1A) of the first frame to the first rear stage circuit 100. After the exposure of the second frame is performed, in step S5, various types of processing is performed on the second frame by the processing circuit 94. That is, in step S5, the processing circuit 94 reads out the second thinned captured image data (1B) of the second frame from the photoelectric conversion element 92, stores the read second thinned captured image data (1B) of the second frame in the memory 96, and acquires the second thinned captured image data (1B) of the second frame from the memory 96. In step S6, the processing circuit 94 outputs the second thinned captured image data (1B) of the second frame acquired from the memory 96 to the first rear stage circuit 100 as the display image data of the second frame.

In step S7, the processing circuit 94 starts outputting the recording image data (1A & 1B) that is combined data of the first thinned captured image data and the second thinned captured image data, to the second rear stage circuit 200 along with a start of the output of the display image data (1B) of the second frame.

In a case where an output time period of the display image data is denoted by t1 and an output time period of the recording image data is denoted by t2, the output time period t1 and the output time period t2 satisfy a relationship "t1<t2". The output time period t2 may be longer than or equal to twice the output time period t1. In the present embodiment, since the live view image is displayed at 60 fps, a relationship "t2<1/60 s" needs to be satisfied.

As the output time period t1 is shortened, a shift in time between an actual image and the live view image is decreased. While the output time period t2 is longer than the output time period t1, the recording image data is not used for displaying unlike the display image data. Thus, a disadvantage to the user is not significant, compared to a case where the output time period of the display image data is set to t2.

While the frame rate of the display image data in the first output line 102 is 120 fps, the frame rate of the recording image data in the second output line is 60 fps. That is, a transfer speed of the recording image data to the second rear stage circuit 200 is lower than a transfer speed of the display image data to the first rear stage circuit 100. Thus, electric power consumption required for transferring the recording image data to the second rear stage circuit 200 is lower than electric power consumption required for transferring the display image data to the first rear stage circuit 100.

Figure 13:
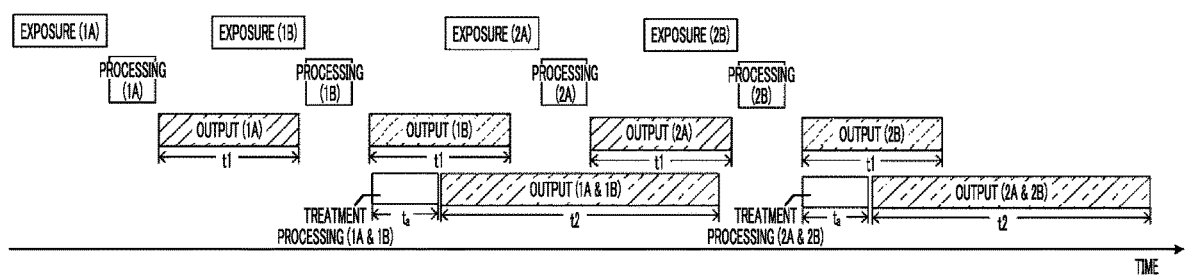
FIG. 13 is a time chart illustrating a first modification example of the sequential processing illustrated in FIG. 12.

In addition, for example, illustrated in FIG. 13, the image processing circuit 94C may perform treatment processing on the recording image data (1A & 1B and 2A & 2B) in a time period $t_a$, and the output circuit 94D may output the recording image data (1A & 1B and 2A & 2B) after the treatment processing to the second rear stage circuit 200. In the treatment processing, the captured image data stored in the memory 96 is referred to by the image processing circuit 94C. For example, at least one processing of defect correction, auto white balance, or gain adjustment is illustrated as the treatment processing. In addition, processing of at least one processing of a plurality of types of processing executed by the image processing portion 210 illustrated in FIG. 5 may be handled by the image processing circuit 94C.

As described above, in the imaging apparatus 10, the output circuit 94D includes the first output line 102 and the second output line 202. The first output line 102 is connected to the first rear stage circuit 100, and the second output line 202 is connected to the second rear stage circuit 200. In the imaging apparatus 10, for example, as illustrated in Table 1 above, both of an output frame rate of the output image data and a data amount of the output image data are different between the first output line 102 and the second output line 202. Accordingly, the imaging apparatus 10 can reduce electric power consumption required for processing of the output image data, compared to a case where the output image data is output to only a single processing portion in a rear stage from the imaging element through only a single output line at a constant frame rate and a constant data amount.

In addition, in the imaging apparatus 10, for example, as illustrated in Table 1 above, the frame rate applied to the first output line 102 is higher than the frame rate applied to the second output line 202. Accordingly, the imaging apparatus 10 can cause the first rear stage circuit 100 to execute processing at a higher speed than processing executed by the second rear stage circuit 200.

In addition, in the imaging apparatus 10, for example, as illustrated in Table 1 above, the output data amount of one frame of the output image data output from the first output line 102 is smaller than the output data amount of one frame of the output image data output from the second output line 202. Accordingly, the imaging apparatus 10 can reduce electric power consumption required for output in the first output line 102, compared to electric power consumption required for output in the second output line 202.

In addition, in the imaging apparatus 10, the output image data output from the first output line 102 is the display image data, and the output image data output from the second output line 202 is the recording image data. Accordingly, the imaging apparatus 10 can cause the first rear stage circuit 100 to process the display image data and cause the second rear stage circuit 200 to process the recording image data.

In addition, in the imaging apparatus 10, the output image data output from the second output line 202 is image data obtained by performing image processing on the captured image data in the imaging element 20. Accordingly, the imaging apparatus 10 can reduce a load of image processing related to the second rear stage circuit 200, compared to a case where all types of image processing for the captured image data are executed by the second rear stage circuit 200.

In addition, in the imaging apparatus 10, the first thinned captured image data and the second thinned captured image data are used as the captured image data. In the imaging apparatus 10, the combined data of the first thinned captured image data and the second thinned captured image data is generated in the imaging element 20, and the generated combined data is used as the recording image data. Accordingly, the imaging apparatus 10 can suppress an increase in electric power consumption caused by the data amount, compared to a case of using only the non-thinned captured image data as the captured image data.

In addition, in the imaging apparatus 10, the laminated imaging element in which the photoelectric conversion element 92 is laminated with the memory 96 is used as the imaging element 20. Accordingly, the imaging apparatus 10 can implement high speed processing in the imaging element 20, compared to a case of using an imaging element of a type in which a photoelectric conversion element is not laminated with a storage portion.

While the high frame rate and the low frame rate are illustrated as the second frame rate in the embodiment, the technology of the present disclosure is not limited thereto. For example, the second frame rate and the data amount applied to each of the first output line 102 and the second output line 202 may be defined as illustrated in Table 2 below. According to Table 2, in a case where n is a predetermined positive real number, the second frame rate applied to the first output line 102 is n times the second frame rate applied to the second output line 202. In this case, the output data amount of one frame of the output image data output from the first output line 102 is 1/n times the output data amount of one frame of the output image data output from the second output line 202. Accordingly, the imaging apparatus 10 can determine the second frame rate and the data amount that contribute to reduction of electric power consumption.

TABLE 2

| Output Line | Ratio of Second Frame Rate | Ratio of Data Amount |
|---|---|---|
| First Output Line | n | 1/n |
| Second Output Line | 1 | 1 |

Here, n is determined in accordance with the first frame rate, processing performance of the first rear stage circuit 100, processing performance of the second rear stage circuit 200, and the like. In this case, for example, n may be derived from a correspondence table in which n, the first frame rate, an indicator indicating the processing performance of the first rear stage circuit 100, and an indicator indicating the processing performance of the second rear stage circuit 200 are associated. Alternatively, n may be calculated from a calculation expression that takes n as a dependent variable and takes the first frame rate, the indicator indicating the processing performance of the first rear stage circuit 100, and the indicator indicating the processing performance of the second rear stage circuit 200 as independent variables. Alternatively, n may be a variable value that is determined in accordance with an instruction received by the touch panel 42 and/or the operation portion 54, or may be a fixed value.

Figure 14:
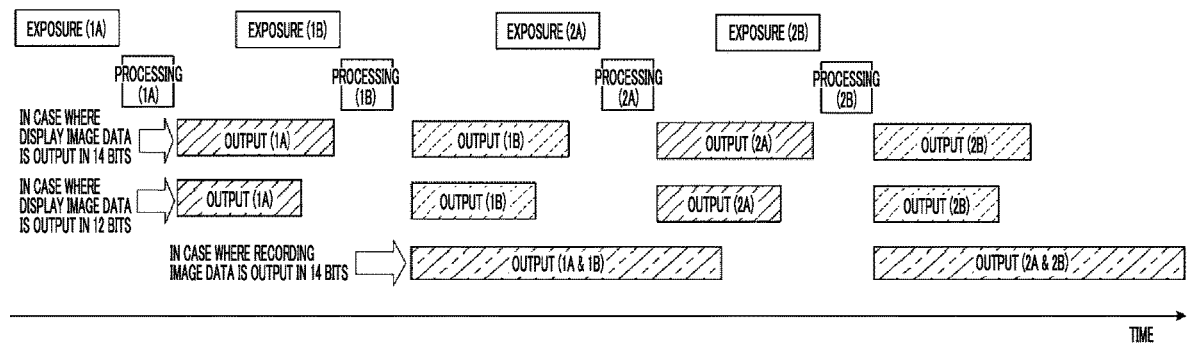
FIG. 14 is a time chart illustrating a second modification example of the sequential processing illustrated in FIG. 12.

In the embodiment, the number of bits per pixel of the display image data is illustrated as being the same as the number of bits per pixel of the recording image data. However, the technology of the present disclosure is not limited thereto. For example, both of the display image data and the recording image data may be set as the non-thinned captured image data. For example, as illustrated in FIG. 14, the number of bits per pixel of the display image data may be set to 12 bits, and the number of bits per pixel of the recording image data may be set to 14 bits. Alternatively, the display image data may be set as the thinned captured image data, and the recording image data may be set as the non-thinned captured image data. The number of bits per pixel of the display image data may be set to be smaller than the number of bits per pixel of the recording image data.

In such a manner, in the imaging apparatus 10, the data amount of the output image data may be differently set by setting the number of bits of the output image data to be different between the first output line 102 and the second output line 202. Accordingly, the imaging apparatus 10 can differently set a time period required in a case of outputting the display image data to the first rear stage circuit 100 from the output circuit 94D, and a time period required in a case of outputting the recording image data to the second rear stage circuit 200 from the output circuit 94D.

In addition, in the processing circuit 94, the thinned captured image data or the non-thinned captured image data of which the number of bits per pixel is A bits may be processed, and the display image data of which the number of bits per pixel is B (<A) bits (in the example illustrated in FIG. 14, 12 bits) may be output to the first rear stage circuit 100 by the output circuit 94D. In such a manner, in the imaging apparatus 10, by outputting the display image data of B bits, the time period required for outputting the display image data becomes shorter than in a case where the display image data of A bits (in the example illustrated in FIG. 14, 14 bits) is output. Consequently, electric power consumption is reduced in accordance with shortening of the time period required for outputting the display image data.

In addition, in a case where a predetermined condition is satisfied, the processing circuit 94 may change, for example, the display image data of 14 bits illustrated in FIG. 14 to, for example, the display image data of 12 bits illustrated in FIG. 14. For example, a condition that an instruction to decrease the number of bits of the display image data is received by the touch panel 42 and/or the operation portion 54, and/or a condition that a continuous operation time period of the first rear stage circuit 100 reaches a predetermined time period (for example, 30 minutes) is illustrated as the predetermined condition.

In addition, while an example of a form in which the recording image data is output to the output circuit 94D in a case where the imaging for the still picture image is performed is illustratively described in the embodiment, the recording image data may be output to the output circuit 94D in a case where the imaging for the motion picture image is performed. In this case, processing of step S352 included in the recording image data generation processing illustrated in FIG. 9 is not necessary.

In addition, while the vertically ½ thinned image is illustrated as the thinned captured image in the embodiment, the technology of the present disclosure is not limited thereto. For example, in a case where z is a natural number greater than or equal to 3, the thinned captured image may be a vertically 1/z thinned image. For example, in a case of employing a vertically ⅓ thinned image as the thinned captured image, the second frame rate applied to the first output line 102 is preferably set to 180 fps. In this case, the second frame rate applied to the second output line 202 may be 60 fps.

In addition, while an example of a form in which the frame rate and the data amount are differently set between the first output line 102 and the second output line 202 is illustratively described in the embodiment, the technology of the present disclosure is not limited thereto. For example, either the frame rate or the data amount may be different between the first output line 102 and the second output line 202.

In addition, while the processing circuit 94 implemented by the ASIC is illustrated in the embodiment, at least one processing (hereinafter, referred to as "in-imaging element processing") of the display image data generation processing, the recording image data generation processing, or the output circuit processing may be implemented by a computer using a software configuration.

Figure 15:
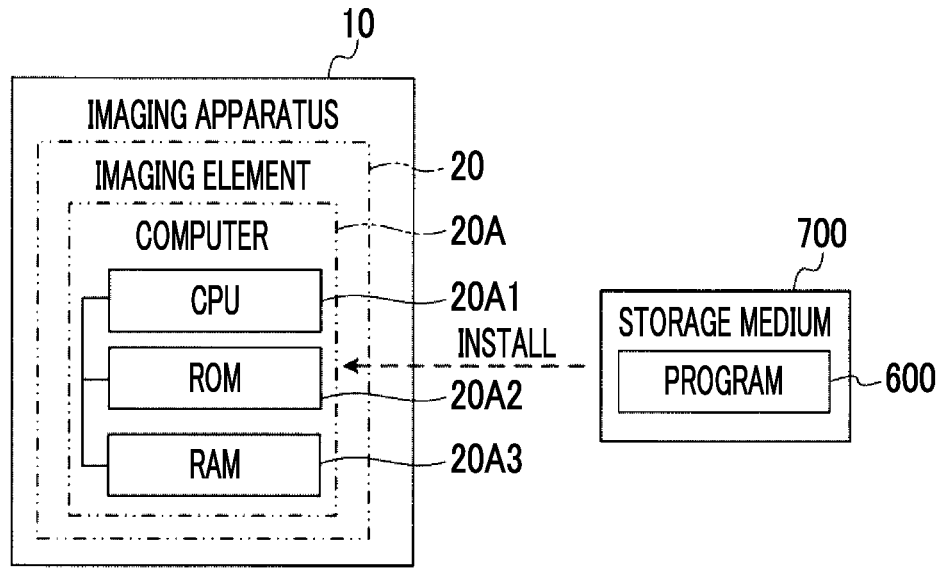
FIG. 15 is a conceptual diagram illustrating one example of an aspect where a program according to the embodiment is installed on the imaging element from a storage medium storing the program according to the embodiment.

In this case, for example, as illustrated in FIG. 15, a program 600 for causing a computer incorporated in the imaging element 20 to execute the in-imaging element processing is stored in a storage medium 700. The computer 20A comprises a CPU 20A1, a ROM 20A2, and a RAM 20A3. The program 600 of the storage medium 700 is installed on the computer and the CPU 20A1 of the computer 20A executes the in-imaging element processing in accordance with the program 600. A single CPU is illustrated as the CPU 20A1. However, the technology of the present disclosure is not limited thereto, and a plurality of CPUs may be employed instead of the CPU 20A1. That is, various types of processing executed by the CPU may be executed by one processor or a plurality of physically separated processors.

Any portable storage medium such as an SSD or a USB memory is illustrated as one example of the storage medium 700.

Alternatively, the program 600 may be stored in a storage portion of another computer, a server apparatus, or the like connected to the computer 20A through a communication network (not illustrated), and the program 600 may be downloaded to the computer 20A in accordance with a request from the imaging apparatus 10 or the like. In this case, the downloaded program 600 is executed by the computer 20A.

The computer 20A may be disposed on the outside of imaging element 20. In this case, the computer 20A may control the processing circuit 94 in accordance with the program 600.

Various processors illustrated below can be used as a hardware resource for executing the in-imaging element processing described in the embodiment. For example, as described above, a CPU that is a general-purpose processor functioning as the hardware resource for executing the in-imaging element processing by executing software, that is, the program, is illustrated as a processor. Alternatively, a dedicated electric circuit such as an FPGA, a PLD, or an ASIC that is a processor having a circuit configuration dedicatedly designed to execute a specific type of processing is illustrated as a processor. A memory is incorporated in or connected to any of the processors, and any of the processors executes the in-imaging element processing using the memory.

The hardware resource for executing the in-imaging element processing may be configured with one of those various processors or may be configured with a combination of two or more processors of the same type or different types (for example, a combination of a plurality of FPGAs or a combination of a CPU and an FPGA). Alternatively, the hardware resource for executing various types of processing according to the embodiment of the technology of the present disclosure may be one processor.

As an example of a configuration with one processor, first, as represented by a computer such as a client and a server, a form in which one processor is configured with a combination of one or more CPUs and software and this processor functions as the hardware resource for executing the in-imaging element processing is available. Second, as represented by a system-on-a-chip (SoC) or the like, a form of using a processor that implements, by one IC chip, a function of the entire system including a plurality of hardware resources for executing the in-imaging element processing is available. In such a manner, the in-imaging element processing is implemented using one or more of above various processors as a hardware resource.

Furthermore, as a hardware structure of those various processors, more specifically, an electric circuit in which circuit elements such as semiconductor elements are combined can be used.

Figure 16:
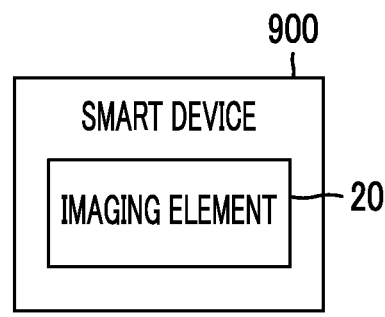
FIG. 16 is a block diagram illustrating one example of a schematic configuration of a smart device incorporating the imaging element according to the embodiment.

While an interchangeable lens camera is illustrated as the imaging apparatus 10 in the embodiment, the technology of the present disclosure is not limited thereto. For example, the technology of the present disclosure may be applied to a smart device 900 illustrated in FIG. 16. For example, the smart device 900 illustrated in FIG. 16 is one example of the imaging apparatus according to the embodiment of the technology of the present disclosure. The imaging element 20 described in the embodiment is mounted on the smart device 900. Even with the smart device 900 configured in such a manner, the same actions and effects as the imaging apparatus 10 described in the embodiment are achieved. The technology of the present disclosure can be applied to not only the smart device 900 but also a PC or a wearable terminal apparatus.

While the first display 40 and the second display 80 are illustrated as the display apparatus in the embodiment, the technology of the present disclosure is not limited thereto. For example, a separate display that is retrofit into the imaging apparatus main body 12 may be used as the "display portion" according to the embodiment of the technology of the present disclosure.

In addition, the in-imaging element processing described in the embodiment is merely one example. Accordingly, unnecessary steps may be removed, new steps may be added, or a processing order may be changed without departing from a gist of the present disclosure.

Above described contents and illustrated contents are detailed description for parts according to the embodiment of the technology of the present disclosure and are merely one example of the technology of the present disclosure. For example, description related to the above configurations, functions, actions, and effects is description related to one example of configurations, functions, actions, and effects of the parts according to the embodiment of the technology of the present disclosure. Thus, unnecessary parts may be removed, new elements may be added, or parts may be replaced in the above described contents and the illustrated contents without departing from the gist of the technology of the present disclosure. In addition, particularly, description related to common technical knowledge or the like that does not need to be described in terms of embodying the technology of the present disclosure is omitted in the above described contents and the illustrated contents in order to avoid complication and facilitate understanding of the parts according to the embodiment of the technology of the present disclosure.

In the present specification, "A and/or B" has the same meaning as "at least one of A or B". This means that "A and/or B" may be only A, only B, or a combination of A and B. In addition, in the present specification, the same approach as "A and/or B" is applied to a case where three or more matters are represented by connecting the matters with "and/or".

All documents, patent applications, and technical standards disclosed in the present specification are incorporated in the present specification by reference to the same extent as in a case where each of the documents, patent applications, technical standards is specifically and individually indicated to be incorporated by reference.

What is claimed is:

1. An imaging element comprising:
   a processing circuit that performs analog/digital conversion on captured image data obtained by imaging a subject;
   a memory that is capable of storing the captured image data obtained as a result of performing the analog/digital conversion by the processing circuit; and
   an output circuit that outputs output image data based on the captured image data stored in the memory to an exterior of the imaging element,
   wherein the output circuit includes a first output line and a second output line,
   the first output line is connected to a first signal processing circuit disposed at the exterior,
   the second output line is connected to a second signal processing circuit disposed at the exterior,
   at least one of an output frame rate of the output image data or an output data amount of the output image data is different between the first output line and the second output line,
   the output frame rate of the first output line is n times the output frame rate of the second output line, and
   the output data amount of one frame of the output image data output from the first output line is 1/n times the output data amount of one frame of the output image data output from the second output line,
   where n is a predetermined positive real number.

2. The imaging element according to claim 1,
   wherein the output frame rate of the first output line is higher than the output frame rate of the second output line.

3. The imaging element according to claim 1,
   wherein the output data amount of one frame of the output image data output from the first output line is smaller than the output data amount of one frame of the output image data output from the second output line.

4. The imaging element according to claim 1,
   wherein the output data amount of the output image data is made different between the first output line and the second output line by setting a number of bits of the output image data to be different between the first output line and the second output line.

5. The imaging element according to claim 4, wherein the number of bits of the output image data output from the first output line is smaller than the number of bits of the output image data output from the second output line.

6. The imaging element according to claim 2, wherein the output image data output from the first output line is image data for displaying, and the output image data output from the second output line is image data for recording.

7. The imaging element according to claim 1, wherein the output image data output from the second output line is image data obtained as a result of performing image processing on the captured image data by the processing circuit in the imaging element.

8. The imaging element according to claim 7, wherein the captured image data is a plurality of items of thinned image data indicating a plurality of thinned images in which mutually different pixels are thinned, and the image processing includes processing of combining the plurality of items of thinned image data.

9. An imaging apparatus comprising:
the imaging element according to claim 1; and
a processor that performs a control for displaying, on a display, an image based on the output image data output by the output circuit included in the imaging element.

10. An image data output method of an imaging element comprising a processing circuit that performs analog/digital conversion on captured image data obtained by imaging a subject, a memory that is capable of storing the captured image data obtained as a result of performing processing by the processing circuit, and an output circuit that includes a first output line and a second output line, the image data output method comprising:
connecting the first output line to a first signal processing circuit disposed at an exterior of the imaging element;
connecting the second output line to a second signal processing circuit disposed at the exterior;
outputting, by the output circuit, output image data based on the captured image data stored in the memory to the exterior; and
setting at least one of an output frame rate of the output image data or an output data amount of the output image data to be different between the first output line and the second output line,
wherein the output frame rate of the first output line is n times the output frame rate of the second output line, and
the output data amount of one frame of the output image data output from the first output line is 1/n times the output data amount of one frame of the output image data output from the second output line,
where n is a predetermined positive real number.

11. A non-transitory storage medium storing program that causes an imaging element to perform an image data output processing, the imaging element comprising a processing circuit that performs analog/digital conversion on captured image data obtained by imaging a subject, a memory that is capable of storing the captured image data obtained as a result of performing processing by the processing circuit, and the output circuit that includes a first output line and a second output line, wherein the first output line is connected to a first signal processing circuit disposed at an exterior of the imaging element, and the second output line is connected to a second signal processing circuit disposed at the exterior,
the image data output processing comprising:
outputting, by the output circuit, output image data based on the captured image data stored in the memory to the exterior, and
setting at least one of an output frame rate of the output image data or an output data amount of the output image data to be different between the first output line and the second output line,
wherein the output frame rate of the first output line is n times the output frame rate of the second output line, and
the output data amount of one frame of the output image data output from the first output line is 1/n times the output data amount of one frame of the output image data output from the second output line,
where n is a predetermined positive real number.

* * * * *